(12) United States Patent
Choi et al.

(10) Patent No.: US 10,168,204 B2
(45) Date of Patent: Jan. 1, 2019

(54) ELECTRONIC DEVICE AND METHOD FOR DETERMINING WATERPROOFING OF THE ELECTRONIC DEVICE

(71) Applicant: Samsung Electronics Co., Ltd., Suwon-si, Gyeonggi-do (KR)

(72) Inventors: Min-Jun Choi, Gumi-si (KR); Min-Woo Song, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 14/922,687

(22) Filed: Oct. 26, 2015

(65) Prior Publication Data
US 2016/0116443 A1 Apr. 28, 2016

(30) Foreign Application Priority Data
Oct. 28, 2014 (KR) .................. 10-2014-0147456

(51) Int. Cl.
| | |
|---|---|
| G01N 29/12 | (2006.01) |
| G01N 29/44 | (2006.01) |
| H04R 29/00 | (2006.01) |
| G01H 13/00 | (2006.01) |
| G01M 3/24 | (2006.01) |

(52) U.S. Cl.
CPC .............. *G01H 13/00* (2013.01); *G01M 3/24* (2013.01)

(58) Field of Classification Search
CPC .............. G01N 29/12; G01N 29/4445; G01N 2291/014; G01N 2291/0289; H04R 29/00; G01H 13/00; G01M 3/24

USPC .......................................................... 73/579
See application file for complete search history.

(56) References Cited

U.S. PATENT DOCUMENTS

| | | | | |
|---|---|---|---|---|
| 2002/0049463 | A1* | 4/2002 | Friedman | A61B 17/32006 606/169 |
| 2004/0134280 | A1* | 7/2004 | Hedberg | G01N 3/30 73/579 |
| 2007/0180913 | A1* | 8/2007 | Higashihara | H04R 27/00 73/579 |
| 2013/0041334 | A1* | 2/2013 | Prioleau | A61F 13/42 604/361 |
| 2013/0125625 | A1* | 5/2013 | Canfield | E03D 1/00 73/40.5 A |
| 2014/0028459 | A1* | 1/2014 | Solomon | G01M 3/243 340/605 |
| 2014/0082394 | A1* | 3/2014 | Kitano | G06F 1/3287 713/324 |

FOREIGN PATENT DOCUMENTS

KR 20-0350105 Y1 5/2004

\* cited by examiner

*Primary Examiner* — Natalie Huls
*Assistant Examiner* — Monica S Young
(74) *Attorney, Agent, or Firm* — Jefferson IP Law, LLP

(57) ABSTRACT

An electronic device is provided. The electronic device includes a speaker configured to output a reference signal in the form of a sound and a processor configured to calculate a lowest resonant frequency from a signal sensed by feeding back the reference signal transmitted to the speaker and to determine whether the electronic device is waterproofed based on the calculated lowest resonant frequency.

20 Claims, 18 Drawing Sheets

ELECTRONIC DEVICE AND METHOD FOR DETERMINING WATERPROOFING OF THE ELECTRONIC DEVICE

CROSS-REFERENCE TO RELATED APPLICATION(S)

This application claims the benefit under 35 U.S.C. § 119(a) of a Korean patent application filed on Oct. 28, 2014 in the Korean Intellectual Property Office and assigned Serial number 10-20014-0147456, the entire disclosure of which is hereby incorporated by reference.

TECHNICAL FIELD

The present disclosure relates to an electronic device and a method for determining waterproofing of the electronic device.

BACKGROUND

Generally, electronic devices refer to devices that perform particular functions according to embedded programs, including home appliances, electronic notes, portable multimedia players (PMPs), mobile communication terminals, tablet personal computers (PCs), video/audio devices, desktop/laptop computers, vehicle navigation systems, and so forth. The electronic devices output may be stored as information in the form of audio and video. As the electronic devices have become highly integrated and high-speed and high-volume wireless communication has come into wide use, various functions have been mounted in a single mobile communication terminal.

For example, not only communication functions, but also entertainment functions such as games, multimedia functions such as music/video playback, communication and security functions for mobile banking, schedule management or electronic wallet functions, and so forth have been provided in a single electronic device.

Such an electronic device may need a dustproof or waterproof structure to guarantee a smooth operation and to prevent introduction of foreign substances, depending on a use environment.

When users use electronic devices, submersion may occur due to damage or carelessness during the use of the electronic devices. However, there is no way for the user to check if the electronic device is waterproofed during the use of the electronic device. Although a waterproof test is usually carried out using external devices in a process of manufacturing the electronic device prior to delivery of the electronic device, there is no way for the user to check waterproofing of the electronic device after the delivery of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for determining waterproofing of the electronic device, in which a change in an air flow, caused by a sound played or output through a speaker of the electronic device, is sensed to determine waterproofing of the electronic device.

In accordance with an aspect of the present disclosure, an electronic device is provided. The electronic device includes a speaker configured to output a reference signal in the form of a sound and a processor configured to calculate a lowest resonant frequency from a signal sensed by feeding back the reference signal transmitted to the speaker and to determine whether the electronic device is waterproofed based on the calculated lowest resonant frequency.

In accordance with another aspect of the present disclosure, a method for operating an electronic device is provided. The method includes outputting a reference signal in the form of a sound through a speaker, sensing a signal by feeding back the reference signal transmitted to the speaker, calculating a lowest resonant frequency from the sensed signal, and determining whether the electronic device is waterproofed based on the calculated lowest resonant frequency.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
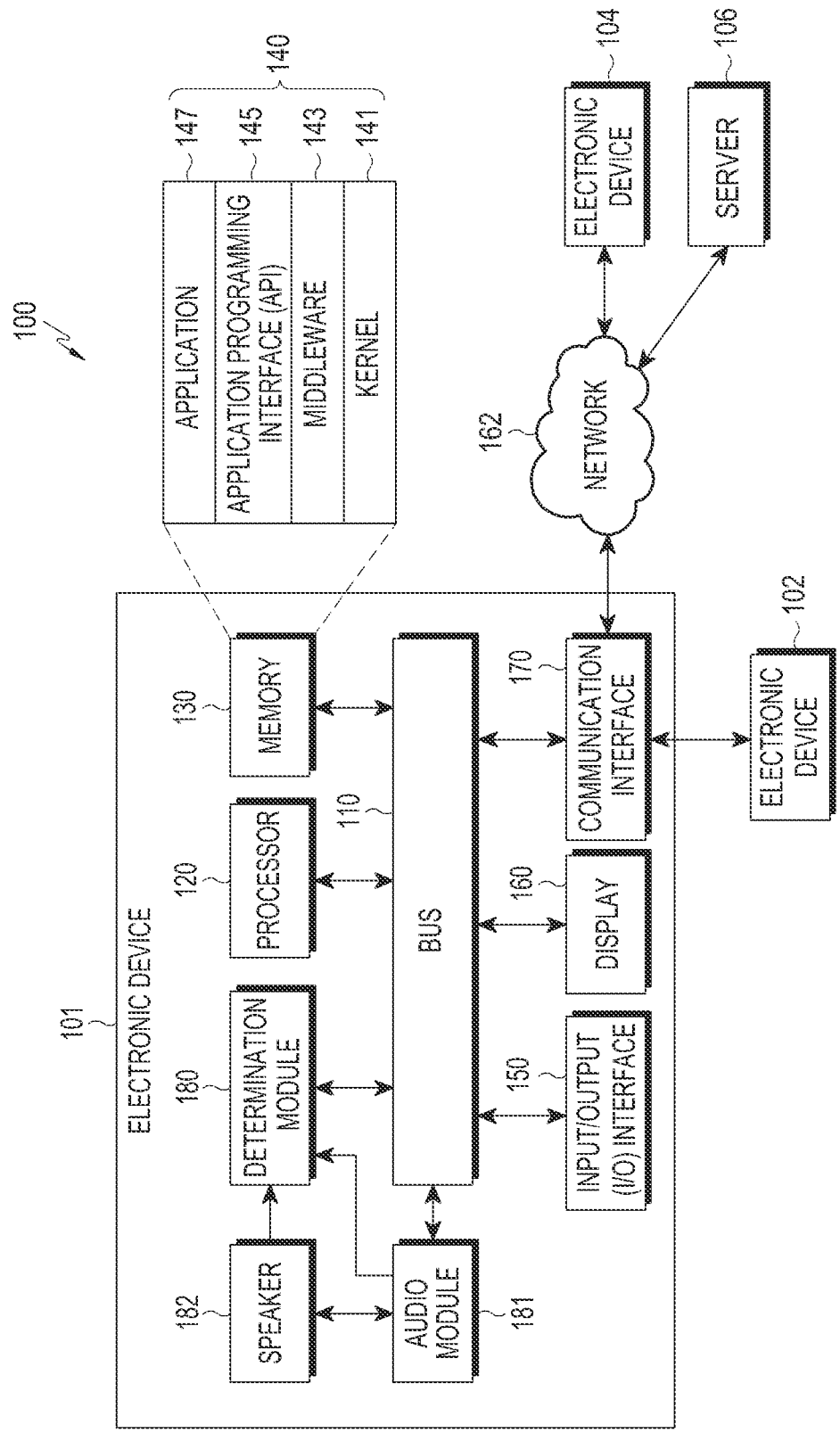
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments of the present disclosure may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situations, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation or at a memory device.

Terms defined in the present disclosure are used for describing an embodiment of the present disclosure and do not have an intention to limit the scope of other various embodiments of the present disclosure. When used in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present various embodiments of the present disclosure.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer-3 (MP3) player, mobile medical equipment, a camera, and a wearable device (e.g., smart glasses, a head-mounted device (HMD), an electronic cloth, an electronic bracelet, an electronic necklace, an appcessory, an electronic tattoo, a smart mirror, or a smart watch).

According to various embodiments of the present disclosure, the electronic device may be a smart home appliance. The home appliance may include, for example, at least one of a television (TV), a digital versatile disc (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to an embodiment of the present disclosure, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), MR imaging (MRI), computed tomography (CT), an imaging device, or an ultrasonic device), a navigation system, a global positioning system (GPS) receiver, an event data recorder (EDR), a flight DR (FDR), a vehicle infotainment device, electronic equipment for ships (e.g., navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.).

According to various embodiments of the present disclosure, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

FIG. 1 illustrates a network environment according to an embodiment of the present disclosure.

Referring to FIG. 1, a description will be made of an electronic device 101 in a network environment 100 according to various embodiments of the present disclosure. The electronic device 101 may include at least one of a bus 110, a processor 120, a memory 130, an input/output (I/O) interface 150, a display 160, a communication interface 170, and a determination module 180. According to various embodiments of the present disclosure, the electronic device 101 may omit at least one of the foregoing elements or may further include other elements.

The bus 110 may include a circuit for interconnecting the elements 120 through 180 described above and for allowing communication (e.g., a control message and/or data) between the elements 120 through 180.

The processor 120 may include one or more of a CPU, an AP, and a communication processor (CP). The processor 120 performs operations or data processing for control and/or communication of, for example, at least one other element of the electronic device 101.

The memory 130 may include a volatile and/or nonvolatile memory. The memory 130 may store, for example, commands or data associated with at least one other element of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least some of the kernel 141, the middleware 143, and the API 145 may be referred to as an operating system (OS).

The kernel 141 controls or manages, for example, system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 access separate components of the electronic device 101 to control or manage the system resources.

The middleware 143 may work as an intermediary for allowing, for example, the API 145 or the application program 147 to exchange data in communication with the kernel 141.

In regard to task requests received from the application program 147, the middleware 143 may perform control (e.g., scheduling or load balancing) with respect to the task requests, for example, by giving priorities for using a system resource (e.g., the bus 110, the processor 120, or the memory 130) of the electronic device 101 to at least one application program 147.

The API 145 is an interface used for the application program 147 to control a function provided by the kernel 141 or the middleware 143, and may include, for example, at least one interface or function (e.g., a command) for file control, window control, image processing or character control.

The I/O interface 150 serves as an interface for delivering a command or data input from a user or another external device to other element(s) 110 through 180 of the electronic device 101. The I/O interface 150 may also output a command or data received from other element(s) 110 through 180 of the electronic device 101 to a user or another external device.

The display 160 may include, for example, a liquid crystal display (LCD), a light emitting diode (LED) display, an organic LED (OLED) display, a microelectromechanical system (MEMS) display, or an electronic paper display. The display 160 may display various contents (e.g., a text, an image, video, an icon, or a symbol) to users. The display 160 may include a touch screen, and receives a touch, a gesture, proximity, or a hovering input, for example, by using an electronic pen or a part of a body of a user.

The communication interface 170 sets up communication, for example, between the electronic device 101 and an external device (e.g., a first external electronic device 102, a second external electronic device 104, or a server 106). For example, the communication interface 170 is connected to a network 162 through wireless or wired communication to communicate with the external device (e.g., the second external electronic device 104 or the server 106).

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). The wired communication may include, for example, at least one of a universal serial bus (USB), a high definition multimedia interface (HDMI), a recommended standard (RS)-2032, and a plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, all or some of operations performed in the electronic device 101 may be performed in another electronic device or a plurality of electronic devices (e.g., the electronic devices 102 and 104 or the server 106). According to an embodiment of the present disclosure, when the electronic device 101 has to perform a function or a service automatically or upon request, the electronic device 101 may request another device (e.g., the electronic devices 102 and 104 or the server 106) to perform at least some functions associated with the function or the service instead of or in addition to executing the function or the service. The other electronic device (e.g., the electronic devices 102 and 104 or the server 106) may perform the requested function or an additional function and deliver the result to the electronic device 101. The electronic device 101 provides the received result or provides the requested function or service by processing the received result. To this end, for example, cloud computing, distributed computing, or client-server computing may be used.

Although the electronic device 101 includes the communication interface 170 to communicate with the external electronic device 104 or the server 106 through the network 162 in FIG. 1, the electronic device 101 may be implemented to independently operate in the electronic device 101 without a separate communication function according to various embodiments of the present disclosure.

According to an embodiment of the present disclosure, the server 106 performs at least one of operations (or functions) implemented in the electronic device 101 to support driving of the electronic device 101. For example, the server 106 may include a waterproofing determination server module (not shown) capable of supporting the determination module 180 implemented in the electronic device 101. The waterproofing determination server module may include at least one element of the determination module 180 to perform (or substitute for) at least one of operations (or functions) implemented by the determination module 180. The determination module 180 is illustrated as a module separated from the processor 120 in FIG. 1, but the entire function of the determination module 180 may be included in the processor 120 or another processor.

The determination module 180 processes at least a part of information obtained from other elements (for example, the processor 120, the memory 130, the I/O interface 150, the display 160, the communication interface 170, an audio module 181, a speaker 182, and so forth), and provides the obtained information part to the user in various ways.

For example, according to various embodiments of the present disclosure, the determination module 180 may sense a feedback signal (e.g., a voltage and/or a current of the feedback signal) with respect to a reference signal output to the speaker 182 to calculate a lowest resonant frequency and/or an excursion value, and determine from the calculated lowest resonant frequency and/or excursion value whether the electronic device 101 is waterproofed.

Figure 2:
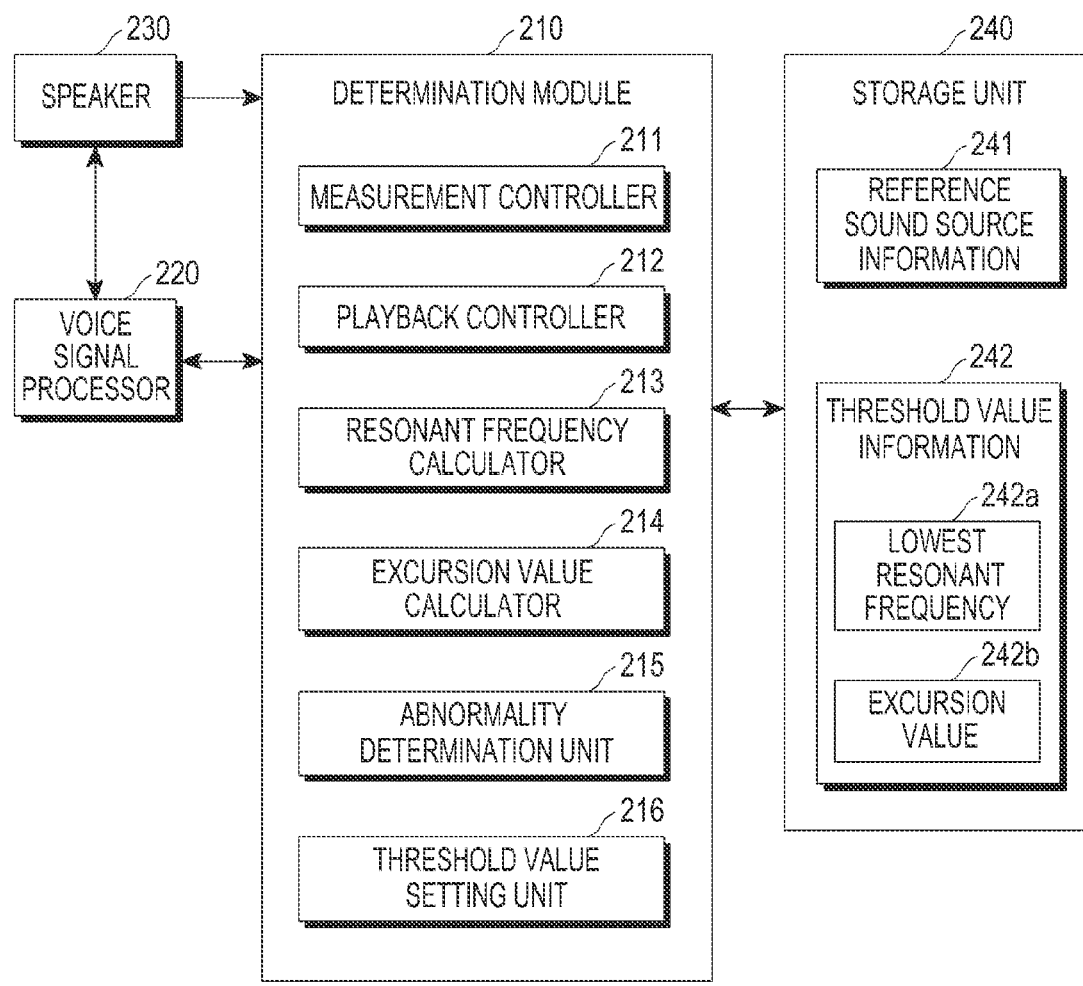
FIG. 2 illustrates an example of an electronic device according to an embodiment of the present disclosure.

According to various embodiments of the present disclosure, the audio module 181 senses the feedback signal (e.g., a voltage and/or a current of the feedback signal) with respect to the reference signal output to the speaker 182, and the determination module 180 calculates a lowest resonant frequency and/or an excursion value from the feedback signal (e.g., the voltage and/or the current of the feedback signal) sensed by the audio module 181 to determine from the calculated lowest resonant frequency and/or excursion value whether the electronic device 101 is waterproofed. With reference to FIG. 2, additional information regarding the determination module 180 will be provided.

FIG. 2 is a block diagram of an electronic device (for example, the electronic device 101 including the determination module 180 of FIG. 1) according to various embodiments of the present disclosure. For convenience, the determination module 180 will be described as being implemented in the processor 120. At least one element included in a determination module 210 of FIG. 2 may be included in the determination module 180 or the processor 120 of FIG. 1.

Referring to FIG. 2, the electronic device may include at least one of the determination module 210, a voice signal processor 220, a speaker 230, and a storage unit 240.

According to various embodiments of the present disclosure, the determination module 210 may include at least one of a measurement controller 211, a playback controller 212, a resonant frequency calculator 213, an excursion value calculator 214, an abnormality determination unit 215, and a threshold value setting unit 216.

The measurement controller 211 checks a condition for a time to determine waterproofing and measures waterproofing at a point in time satisfying the condition. For example, the measurement controller 211 may measure waterproofing when power is switched from an off state to an on state or when the user closes a battery cover after opening the battery cover to replace the battery. If the user uses the electronic device without properly closing the battery cover, water may be introduced through a gap between the battery cover and a main body.

The playback controller 212 plays back reference sound source information 241 stored in the storage unit 240 as a reference signal at any point in time to determine waterproofing. Under control of the playback controller 212, the reference sound source information 241 is transmitted to the voice signal processor 220 as the reference signal which is then subject to voice signal processing in the voice signal processor 220 (e.g., a codec). An electric signal that is processed into a voice signal by the voice signal processor 220 is converted into a sound and is output through the speaker 230.

According to various embodiments of the present disclosure, by sensing the feedback signal with respect to the reference signal transmitted to the speaker 230, waterproofing of the electronic device may be determined. For example, by feeding back the reference signal transmitted to the speaker 230, the voice signal processor 220 or the determination module 210 may sense the fed-back reference signal (or the feedback signal with respect to the reference signal). A sensing value of the feedback signal may be a voltage and/or current value of the feedback signal.

The resonant frequency calculator 213 of the determination module 210 calculates a lowest resonant frequency from the sensing value (e.g., a voltage and/or a current) of the feedback signal with respect to the reference signal. For example, an impedance may be calculated from the voltage and/or the current of the feedback signal with respect to the reference signal, and the lowest resonant frequency may be calculated from the calculated impedance. A frequency corresponding to a point where the highest impedance is measured or corresponding to a point where the impedance is −3 dB from its peak point is determined as the lowest resonant frequency. According to various embodiments of the present disclosure, the lowest resonant frequency may be calculated in various manners. For example, a frequency-specific sound pressure may be calculated and a frequency corresponding to a sound pressure of −3 dB from the highest sound pressure may be determined as the lowest resonant frequency. However, various embodiments of the present disclosure are not limited to the foregoing calculation methods.

The excursion value calculator 214 of the determination module 210 calculates an excursion value from the sensing value of the feedback signal with respect to the reference signal. According to various embodiments of the present disclosure, the excursion value may be calculated in various ways. For example, by using a voltage and/or a current of the feedback signal with respect to the reference signal, a resonant frequency $F_c$ and a quality (Q) factor may be calculated, and the excursion value may be calculated from an excursion transfer function including the calculated resonant frequency $F_c$ and the Q factor. However, various embodiments of the present disclosure are not limited to the foregoing calculation methods.

The abnormality determination unit 215 determines, from the lowest resonant frequency calculated by the resonant frequency calculator 213 and/or the excursion value calculated by the excursion value calculator 214, whether the electronic device is in a normal state (for example, whether the electronic device is waterproofed or whether the battery cover is normally closed). For example, according to various embodiments of the present disclosure, if the lowest resonant frequency and/or the excursion value is outside of a preset range, the abnormality determination unit 215 determines that an abnormality has occurred in the electronic device (for example, the electronic is not waterproofed or the battery cover is not normally closed).

The threshold value setting unit 216 sets a threshold value for an allowable range of the lowest resonant frequency and/or the excursion value where the abnormality determination unit 215 determines whether an abnormality has occurred in the electronic device. The threshold value may be set in advance to be suitable for characteristics of a product at the time of manufacturing the product, or may be variably set according to a user's use of the electronic device. Set threshold value information 242 (for example, threshold information 242a of the lowest resonant frequency or threshold information 242b of the excursion value) may be stored in the storage unit 240. For example, since the threshold value may vary according to a design structure of the product, the threshold value may be set in advance according to a signal distribution specific for a previously measured frequency, or the user may check the threshold value at a product setting stage to automatically input a value suitable for the product.

According to various embodiments of the present disclosure, the reference sound source information 241 stored in the storage unit 240 may be sound source information that is set to check waterproofing or may be arbitrary sound source information from sound source information stored by the user. For example, the sound source information may include a pink noise signal including all frequency components for lowest resonant frequency comparison, or a sweep tone signal in which all frequency signals are sequentially played or a multi-tone signal in which a single tone is sequentially or arbitrarily combined for frequency-specific excursion value comparison.

An electronic device according to any one of various embodiments of the present disclosure may include a speaker configured to output a reference signal in the form of a sound and a processor configured to calculate a lowest resonant frequency from a signal sensed by feeding back the reference signal transmitted to the speaker and to determine whether the electronic device is waterproofed based on the calculated lowest resonant frequency.

According to various embodiments of the present disclosure, the electronic device may further include a voice signal processor configured to perform voice signal processing on the reference signal, in which the voice signal processor receives the fed-back reference signal, senses a voltage and/or a current of the fed-back reference signal, and provides the sensed voltage and/or current to the processor.

According to various embodiments of the present disclosure, the electronic device may further include an amplification unit configured to amplify the reference signal, in which the amplification unit receives the fed-back reference signal, senses a voltage and/or a current of the fed-back reference signal, and provides the sensed voltage and/or current to the processor.

According to various embodiments of the present disclosure, the processor may determine that the electronic device is not in a normal state if the calculated lowest resonant frequency is outside a preset range.

According to various embodiments of the present disclosure, the processor may determine that a battery cover is not normally closed if the calculated lowest resonant frequency is outside a preset range.

According to various embodiments of the present disclosure, the electronic device may further include a display, in which if the processor determines that the battery cover is not normally closed, an alert message is displayed through the display.

According to various embodiments of the present disclosure, the processor may calculate an excursion value from the signal sensed by feeding back the reference signal transmitted to the speaker, and determine whether the electronic device is waterproofed, further taking the calculated excursion value into account.

According to various embodiments of the present disclosure, the processor may determine that the electronic device is not in a normal state if the calculated excursion value is outside a preset range.

According to various embodiments of the present disclosure, if the speaker is configured as a module integrated in the electronic device, the module may include a hole that emits or communicates a sound from an inner side thereof to an outer side thereof.

According to various embodiments of the present disclosure, the processor may determine whether a battery cover of the electronic device is opened or closed, and determine whether the electronic device is waterproofed when the battery cover is closed.

Hereinafter, with reference to FIGS. 3 through 5, various embodiments of a structure of the present disclosure for feeding back the foregoing reference signal and sensing a current and/or a voltage will be described.

Figure 3:
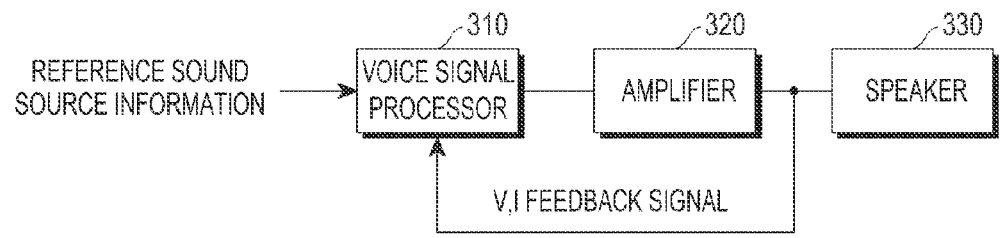
FIG. 3 is a block diagram of an example of an electronic device according to various embodiments of the present disclosure.

FIG. 3 is a block diagram illustrating an example of a structure of an electronic device according to various embodiments of the present disclosure.

Referring to FIG. 3, reference sound source information is processed into a voice signal by a voice signal processor 310. An amplification unit 320 amplifies the voice signal processed by the voice signal processor 310 and transmits the processed voice signal to a speaker 330. The amplification unit 320 may include at least one signal amplification element (e.g., an amplifier). The speaker 330 converts an electric voice signal amplified by the amplification unit 320 into a sound and outputs the sound.

According to various embodiments of the present disclosure, an electric reference signal transmitted to the speaker 330 may be fed back to the voice signal processor 310. For example, the voice signal processor 310 may sense a voltage and/or a current of the fed-back reference signal. The voltage and/or current sensed by the voice signal processor 310 may be provided to the determination module 210 of FIG. 2 for determination of whether the electronic device is abnormal.

Figure 4:
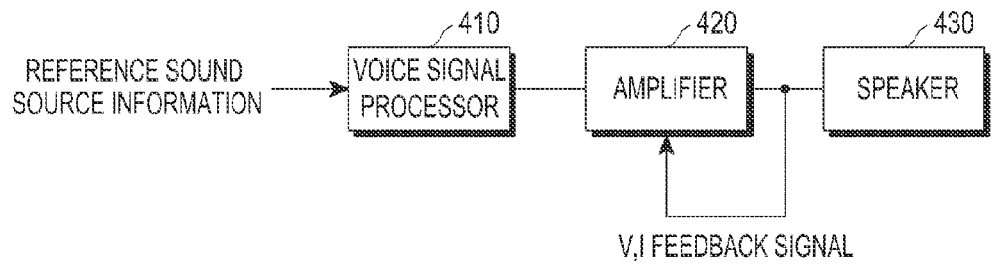
FIG. 4 is a block diagram of an example of an electronic device according to various embodiments of the present disclosure.

FIG. 4 is a block diagram of an example of an electronic device according to various embodiments of the present disclosure.

Referring to FIG. 4, reference sound source information is processed into a voice signal by a voice signal processor 410. An amplification unit 420 amplifies the voice signal processed by the voice signal processor 410 and transmits the amplified voice signal to the speaker 430. The amplification unit 420 may include at least one signal amplifying elements (e.g., an amplifier). The speaker 430 converts an electric voice signal amplified by the amplification unit 420 into a sound and outputs the sound.

According to various embodiments of the present disclosure, the electric reference signal transmitted to the speaker 430 may be fed back to the amplification unit 420. For example, the amplification unit 420 may sense a voltage and/or a current of the fed-back reference signal. The voltage and/or current sensed by the amplification unit 420 may be provided to the determination module 210 to determine whether the electronic device is abnormal.

Figure 5:
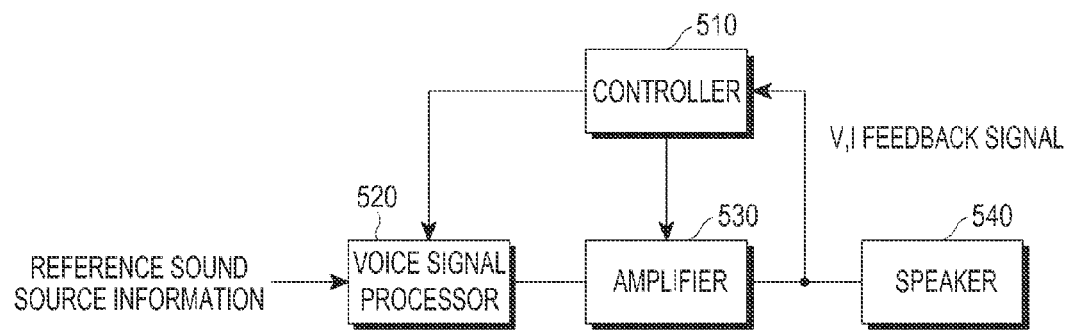
FIG. 5 is a block diagram of an example of an electronic device according to various embodiments of the present disclosure.

FIG. 5 is a block diagram of an example of an electronic device according to various embodiments of the present disclosure.

Referring to FIG. 5, reference sound source information is processed into a voice signal by a voice signal processor 520 under control of a controller 510. An amplification unit 530 amplifies the voice signal processed by the voice signal processor 520, and then transmits the amplified voice signal to a speaker 540. The amplification unit 530 may include at least one signal amplification element (e.g., an amplifier). The speaker 540 converts the electric voice signal amplified by the amplification unit 530 into a sound and outputs the sound.

According to various embodiments of the present disclosure, an electric reference signal transmitted to the speaker 540 may be fed back to the controller 510 (for example, the determination module 210 of FIG. 2). For example, the controller 510 may sense a voltage and/or a current of the fed-back reference signal. The controller 510 calculates a lowest resonant frequency and/or an excursion value from the sensed voltage and/or current to determine whether the electronic device is abnormal.

Figure 6:
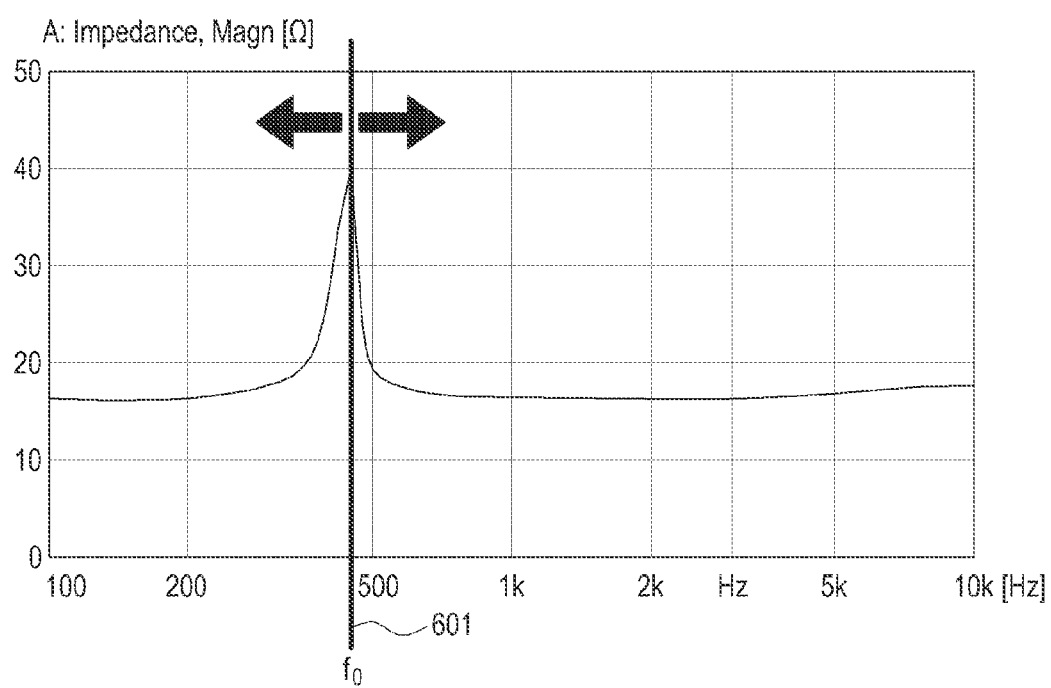
FIG. 6 is a graph showing a lowest resonant frequency according to various embodiments of the present disclosure.

FIG. 6 is a graph showing a lowest resonant frequency according to various embodiments of the present disclosure. In the graph of FIG. 6, the vertical axis denotes impedance in ohms ($\Omega$), and the horizontal axis denotes frequency hertz (Hz). The values of FIG. 6 are for illustration purposes, and embodiments are not limited thereto.

Referring to FIG. 6, a frequency corresponding to the highest impedance calculated by a feedback signal with respect to a reference signal output to a speaker or a frequency corresponding to an impedance of −3 dB from the peak point of the impedance may be determined as a lowest resonant frequency $f_0$ 601.

Figure 7:
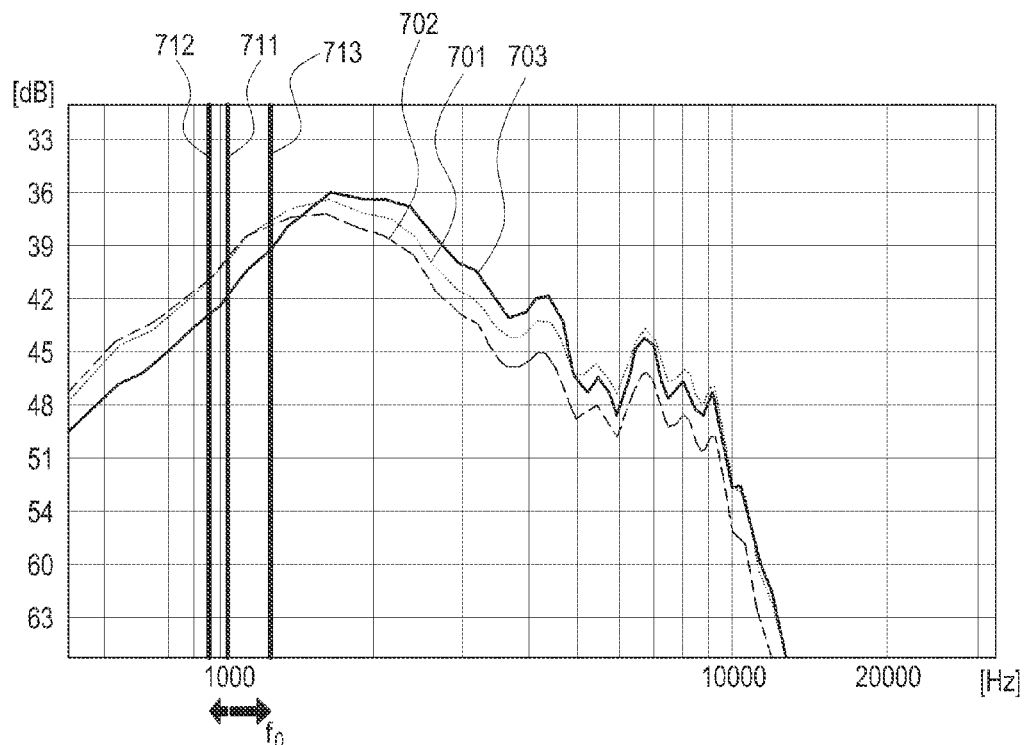
FIG. 7 is a graph showing a normal range of a lowest resonant frequency according to various embodiments of the present disclosure.

FIG. 7 is a graph showing a normal range of a lowest resonant frequency according to various embodiments of the present disclosure. In the graph of FIG. 7, the vertical axis denotes amplitude in decibels (dB), and the horizontal axis denotes frequency in hertz (Hz). The values of FIG. 7 are for illustration purposes, and embodiments are not limited thereto.

Referring to FIG. 7, an impedance of a fed-back reference signal is measured for each frequency and is plotted in the graph. For example, a first lowest resonant frequency 711 may be calculated from an impedance of a first signal 701, a second lowest resonant frequency 712 may be calculated from an impedance of a second signal 702, and a third lowest resonant frequency 713 may be calculated from an impedance of a third signal 703. By determining whether the calculated lowest resonant frequencies fall within a lowest resonant frequency range in a preset normal state, it is determined whether the electronic device is in the normal state (for example, whether the electronic device is waterproofed or whether the battery cover is normally closed).

Figure 8:
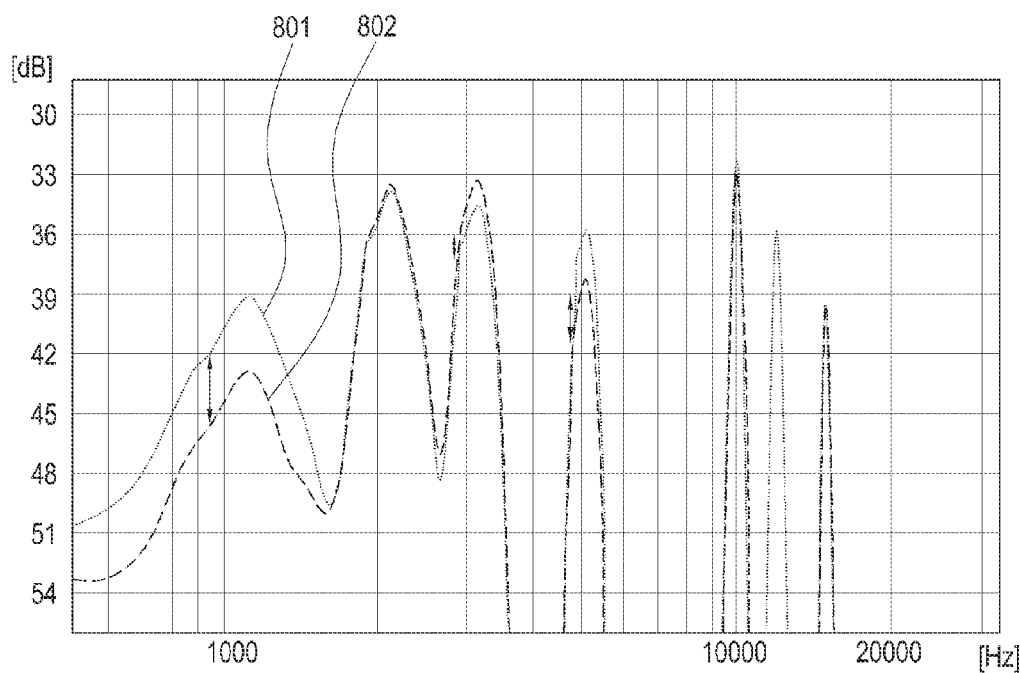
FIG. 8 is a graph showing a comparison between frequency-specific excursion values according to various embodiments of the present disclosure.

FIG. 8 is a graph showing a comparison between frequency-specific excursion values according to various embodiments of the present disclosure. In the graph of FIG. 8, the vertical axis denotes amplitude in decibels (dB), and the horizontal axis denotes frequency in hertz (Hz). The values of FIG. 8 are for illustration purposes, and embodiments are not limited thereto.

Referring to FIG. 8, by calculating a difference between frequency-specific sound pressures from a voltage and/or a current of a fed-back reference signal, an excursion value may be obtained. By determining whether the obtained frequency-specific excursion value is within a preset normal range, it is determined whether the electronic device is normal (for example, whether the electronic device is waterproofed or whether the battery cover is normally closed). For example, by calculating a sound pressure difference between a first signal 801 and a second signal 802, an excursion value may be obtained.

Figure 9:
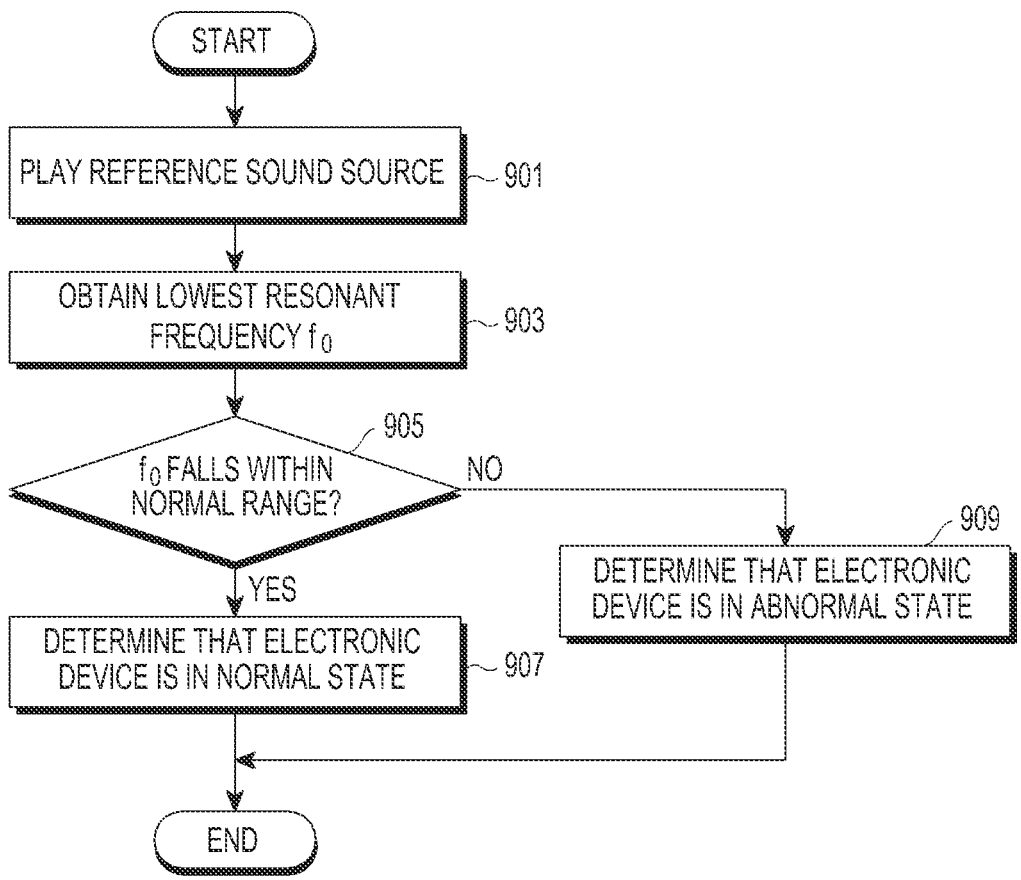
FIG. 9 is a flowchart illustrating a process of determining abnormality of an electronic device according to various embodiments of the present disclosure.

FIG. 9 is a flowchart illustrating a process of determining abnormality of an electronic device according to various embodiments of the present disclosure.

Referring to FIG. 9, in operation 901, a reference sound source is played when a condition for determining whether the electronic device is abnormal is satisfied (for example, when the electronic device is turned on or when the battery cover is closed). In operation 903, a lowest resonant frequency $f_0$ is obtained from a voltage and/or a current of a feedback signal with respect to the played reference sound source.

In operation 905, if the obtained lowest resonant frequency is within a normal range (for example, the obtained lowest resonant frequency is less than a preset threshold value), it is determined that the electronic device is in the normal state in operation 907. If the obtained lowest resonant frequency is outside the normal range (for example, the obtained lowest resonant frequency is greater than the threshold value) in operation 905, it is determined that the electronic device is in an abnormal state in operation 909. According to various embodiments of the present disclosure, if it is determined that the electronic device is in the abnormal state, an alert message may be output on the screen or various functions that are set corresponding to the abnormal state may be automatically or otherwise performed.

One or more of the operations illustrated in FIG. 9 may be omitted or other operations added between operations. The operations illustrated in FIG. 9 may be processed in an illustrated order, or an execution order of at least one operation may be exchanged with that of another operation. Also, the operations illustrated in FIG. 9 may be performed in the electronic device or the server. At least one of the operations illustrated in FIG. 9 may be performed in the electronic device, and the other operations may be performed in the server.

A method for operating an electronic device according to any one of various embodiments of the present disclosure may include outputting a reference signal in the form of a sound through a speaker, sensing a signal by feeding back the reference signal transmitted to the speaker, calculating a lowest resonant frequency from the sensed signal, and determining whether the electronic device is waterproofed based on the calculated lowest resonant frequency.

According to various embodiments of the present disclosure, the method may further include performing, by a voice signal processor, voice signal processing on the reference signal, in which the reference signal is fed back to the voice signal processor which then senses a voltage and/or a current of the fed-back reference signal.

According to various embodiments of the present disclosure, the method may further include amplifying the reference signal that has been signal-processed by the voice signal processor, in which the reference signal is fed back to the amplification unit which then senses a voltage and/or a current from the fed-back reference signal.

According to various embodiments of the present disclosure, the method may further include determining that the electronic device is not in a normal state if the calculated lowest resonant frequency is outside a preset range.

According to various embodiments of the present disclosure, the method may further include determining that a battery cover is not normally closed if the calculated lowest resonant frequency is outside a preset range.

According to various embodiments of the present disclosure, the method may further include displaying an alert message through a display if it is determined that the battery cover is not normally closed.

According to various embodiments of the present disclosure, the method may further include calculating an excursion value from the signal sensed by feeding back the reference signal transmitted to the speaker and determining whether the electronic device is waterproofed, further taking the calculated excursion value into account.

According to various embodiments of the present disclosure, the method may further include determining that the electronic device is not in a normal state if the calculated excursion value is outside a preset range.

According to various embodiments of the present disclosure, the method may further include determining whether a battery cover of the electronic device is opened or closed and determining whether the electronic device is waterproofed when the battery cover is closed.

Figure 10:
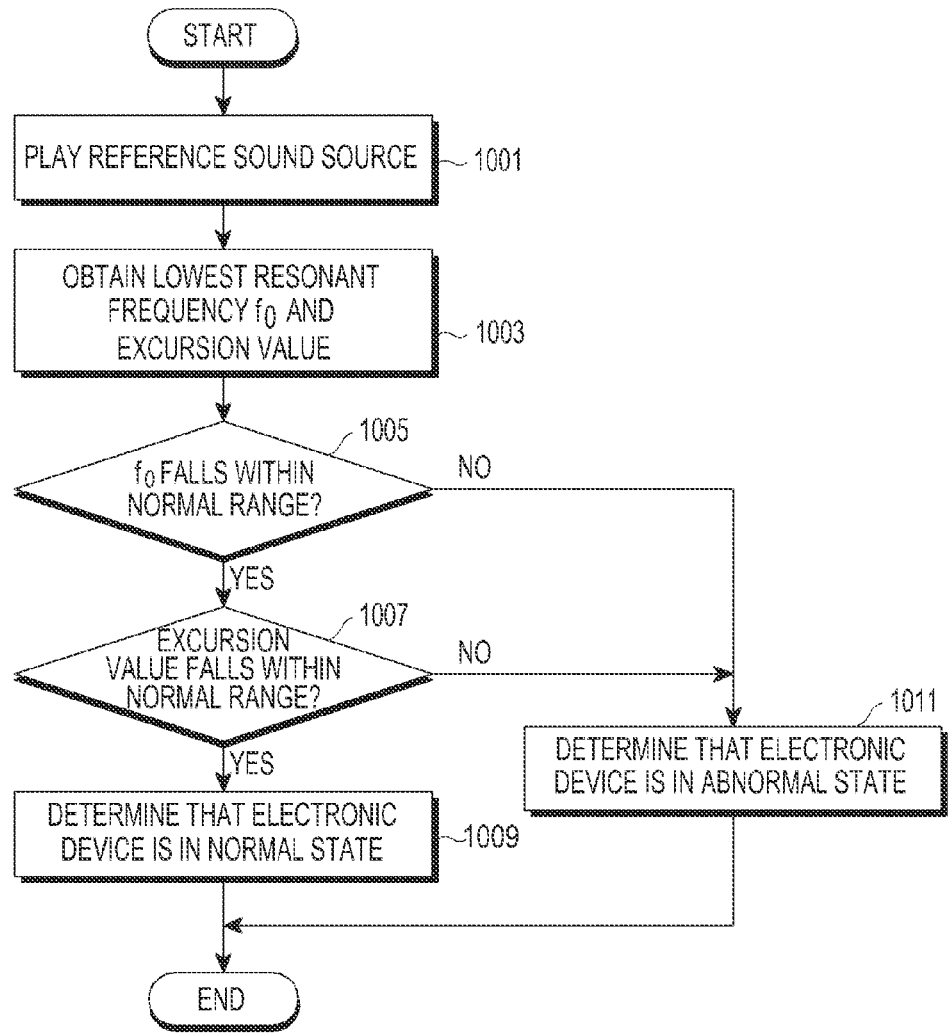
FIG. 10 is a flowchart illustrating a process of determining abnormality of an electronic device according to various embodiments of the present disclosure.

FIG. 10 is a flowchart illustrating a process of determining abnormality of an electronic device according to various embodiments of the present disclosure.

Referring to FIG. 10, in operation 1001, when a condition for determining abnormality of the electronic device is satisfied (for example, when the electronic device is turned on or when the battery cover is closed), a reference sound source may be played. In operation 1003, the lowest resonant frequency $f_0$ and an excursion value may be obtained from a feedback signal (for example, a sensed voltage and/or a sensed current) with respect to the played reference sound source.

If the obtained lowest resonant frequency is within the normal range (for example, the obtained lowest resonant frequency is less than the preset threshold value) in operation 1005, it is further determined whether the obtained excursion value is within the normal range in operation 1007. If the obtained excursion value is within the normal range (for example, the obtained lowest resonant frequency is less than the preset threshold value), it is determined that the electronic device is in the normal state in operation 1009.

If the obtained lowest resonant frequency is outside the normal range (for example, if the obtained lowest resonant frequency is greater than the preset threshold value) in operation 1005, it is determined that the electronic device is in the abnormal state in operation 1011. According to various embodiments of the present disclosure, if it is determined that the electronic device is in the abnormal state, an alert message may be output on the screen or various functions set corresponding to the abnormal state may be automatically or otherwise performed.

When the obtained lowest resonant frequency is within the normal range in operation 1005, it may still be determined that the electronic device is in the abnormal state in operation 1011 if the obtained excursion value is outside the normal range in operation 1007.

One or more of the operations illustrated in FIG. 10 may be omitted or other operations added between operations. The operations illustrated in FIG. 10 may be processed in an illustrated order, or an execution order of at least one operation may be exchanged with that of another operation. Also, the operations illustrated in FIG. 10 may be performed in the electronic device or the server. At least one of the operations illustrated in FIG. 10 may be performed in the electronic device and the other operations may be performed in the server.

Although the lowest resonant frequency is used to determine whether the electronic device is abnormal in FIGS. 9 and 10, the abnormality of the electronic device may also be determined by the excursion value instead of the lowest resonant frequency.

Figure 11:
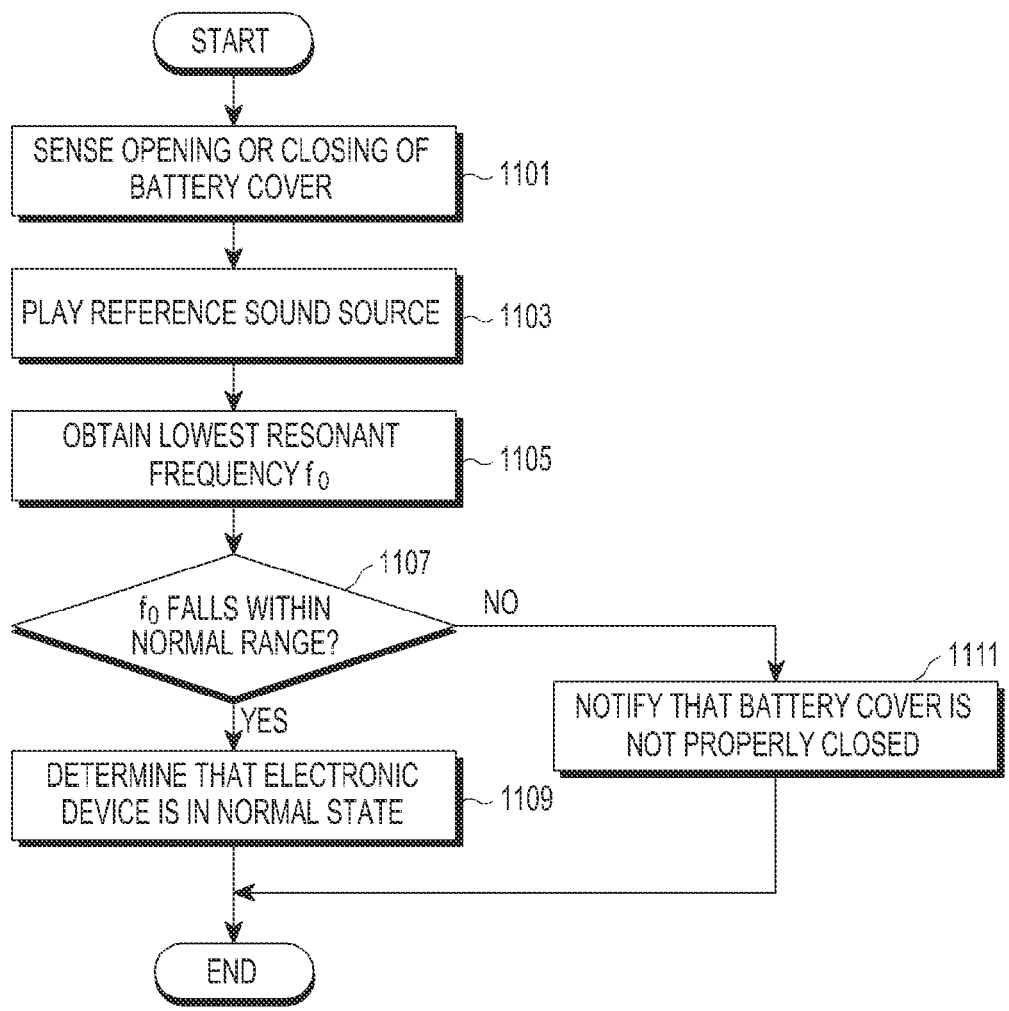
FIG. 11 is a flowchart illustrating a process of determining abnormality of an electronic device according to various embodiments of the present disclosure.

FIG. 11 is a flowchart illustrating a process of determining abnormality of an electronic device according to various embodiments of the present disclosure.

Referring to FIG. 11, if opening or closing of the battery cover is sensed in operation 1101, that point is determined as a time to determine whether the electronic device is abnormal.

For example, as opening or closing of the battery cover is sensed, a reference sound source is played in operation 1103. In operation 1105, the lowest resonant frequency $f_0$ is obtained from a feedback signal (for example, a sensed voltage and/or a sensed current) with respect to the played reference sound source.

If the obtained lowest resonant frequency is within the normal range (for example, if the obtained lowest resonant frequency is less than the preset threshold value) in operation 1107, it is determined that the electronic device is in the normal state in operation 1109. If the obtained lowest resonant frequency is outside the normal range (for example, if the obtained lowest resonant frequency is greater than the preset threshold value) in operation 1107, it is determined that the electronic device is in the abnormal state and notification is provided on the screen, for example, using an alert message that the battery cover is not properly closed in operation 1111.

One or more of the operations illustrated in FIG. 11 may be omitted or other operations added between operations. The operations illustrated in FIG. 11 may be processed in an illustrated order, or an execution order of at least one operation may be exchanged with that of another operation. Also, the operations illustrated in FIG. 11 may be performed in the electronic device or the server. At least one of the operations illustrated in FIG. 11 may be performed in the electronic device, and the other operations may be performed in the server.

Figure 12:
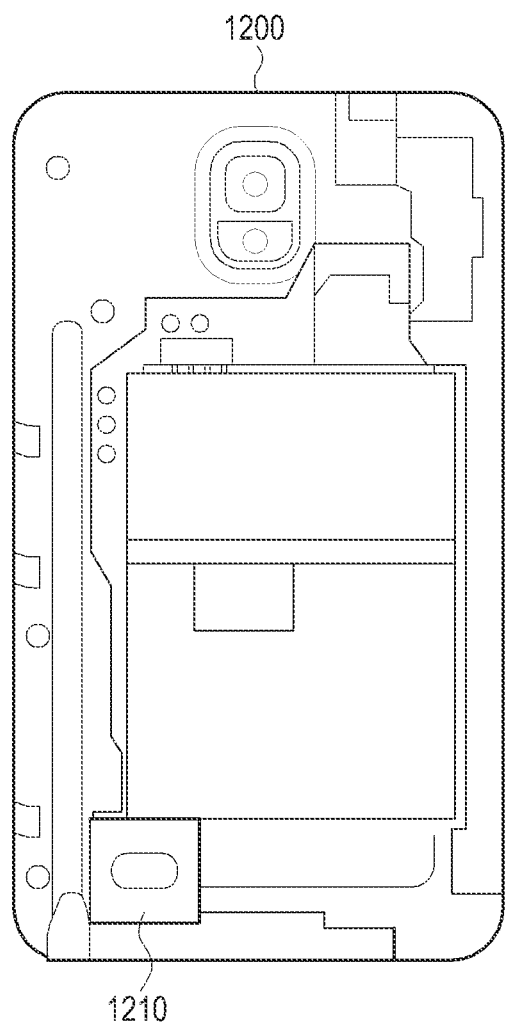
FIG. 12 illustrates an internal structure of an electronic device according to various embodiments of the present disclosure.
Figure 13:
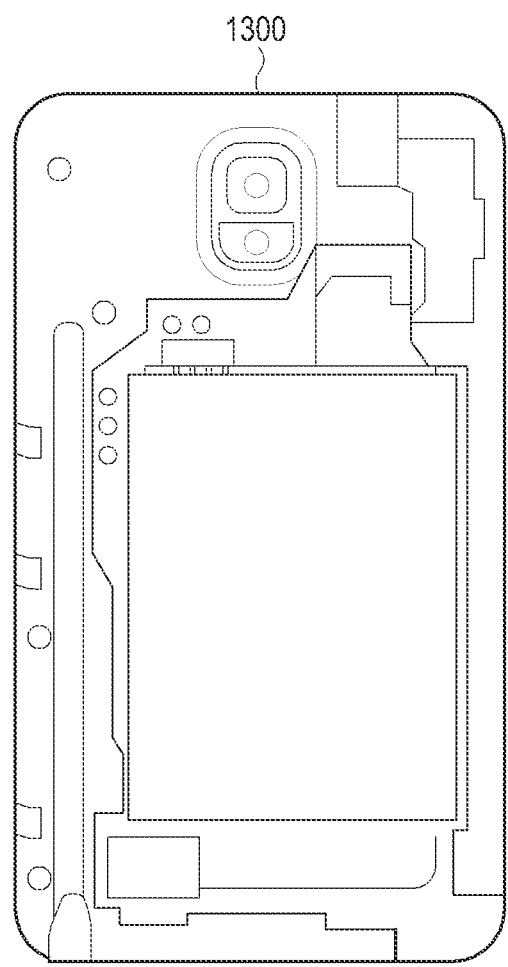
FIG. 13 illustrates an internal structure of an electronic device according to various embodiments of the present disclosure.

FIGS. 12 and 13 illustrate various embodiments corresponding to speaker design structures of the present disclosure.

FIG. 12 illustrates an internal structure of an electronic device according to various embodiments of the present disclosure.

Referring to FIG. 12, an entire set of an electronic device 1200 may be used as a resonance space for sound waves output from a speaker 1210. In this case, since leakage of a sound output from the speaker 1210 to the outside of the electronic device 1200 is closely related to waterproofing, it is possible to determine whether the electronic device is in the abnormal state, without a need to separately change a structure.

FIG. 13 illustrates an internal structure of an electronic device according to various embodiments of the present disclosure.

Figure 16:
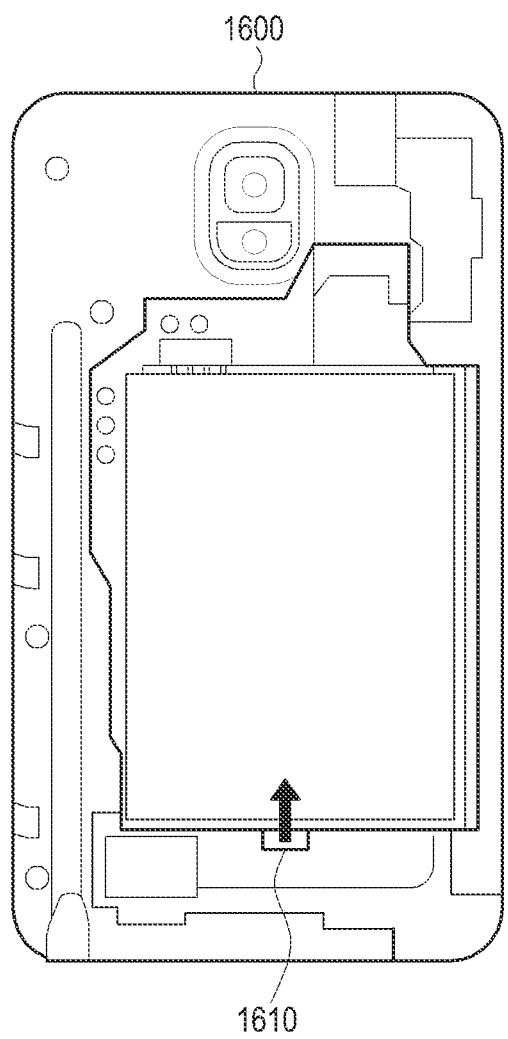
FIG. 16 illustrates an internal structure of an electronic device according to various embodiments of the present disclosure.

Referring to FIG. 13, in an electronic device 1300, a voice processing module including a speaker may be manufactured in the form of a complete module or a semi-complete module. In this case, a sound output from the speaker is generated inside the module, making it difficult to identify a change occurring outside the module through the sound. Thus, as shown in FIG. 16, in a speaker of an electronic device 1600, an air vent hole, opening or passage 1610 for emitting a sound based on vibration of a diaphragm may be used as a pipe-line with a sealing space for waterproofing or a sound emitting hole for determining waterproofing may be additionally formed.

Figure 14:
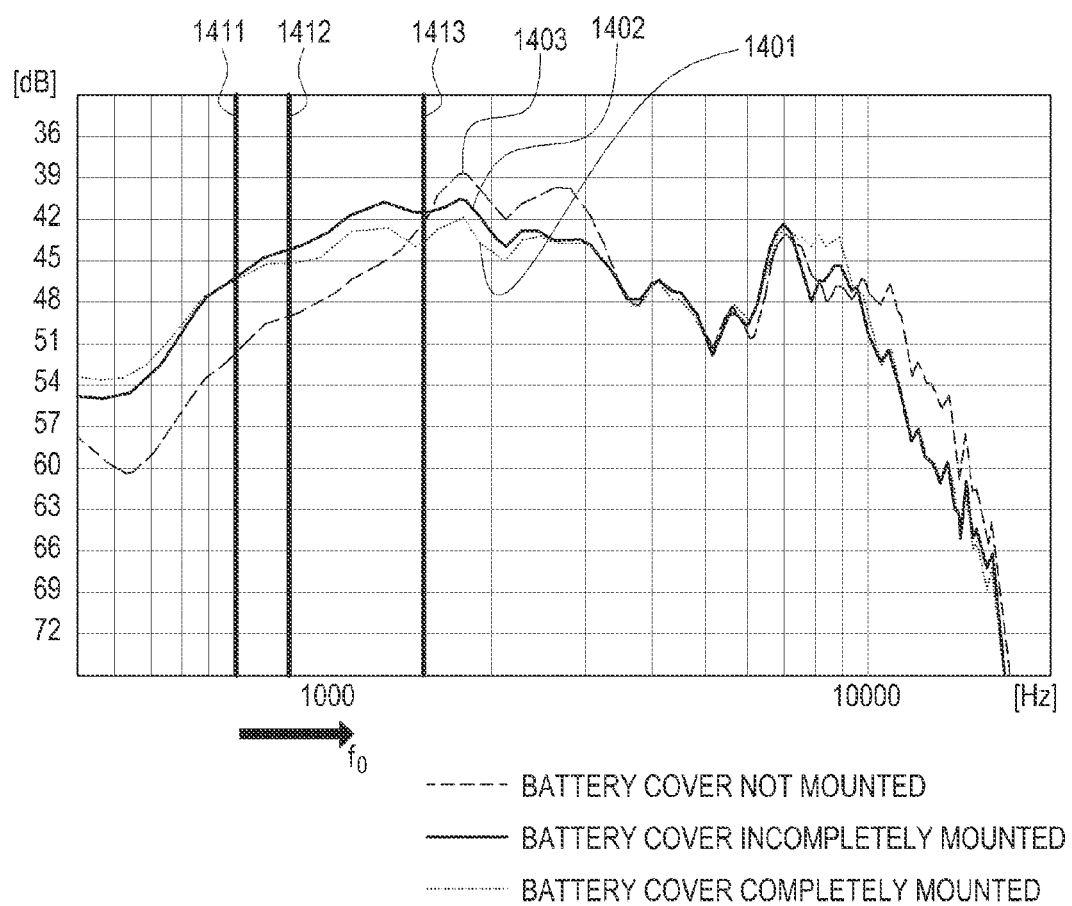
FIG. 14 is a graph illustrating a lowest resonant frequency specifically for a battery cover mounting state according to various embodiments of the present disclosure.

FIG. 14 is a graph illustrating a lowest resonant frequency specifically for a battery cover mounting state according to various embodiments of the present disclosure. In the graph of FIG. 14, the vertical axis denotes amplitude in decibels (dB), and the horizontal axis denotes frequency in hertz (Hz). The values of FIG. 14 are for illustration purposes, and embodiments are not limited thereto.

Referring to FIG. 14, signals 1401, 1402, and 1403 are measured for a case where the battery cover is completely mounted, a case where the battery cover is incompletely mounted, and a case where the battery cover is not mounted, respectively, so as to determine lowest resonant frequencies 1411, 1412, and 1413 for the respective cases.

For example, it can be seen that the lowest resonant frequency 1412 for the case where the battery cover is incompletely mounted is higher than the lowest resonant frequency 1411 for the case where the battery cover is completely mounted. It can also be seen that the lowest resonant frequency 1413 for the case where the battery cover is not mounted is higher than the lowest resonant frequency 1412 for the case where the battery cover is incompletely mounted. As such, by checking the lowest resonant frequencies, it may be determined whether the battery cover is normally mounted and/or whether the electronic device is waterproofed.

Figure 15:
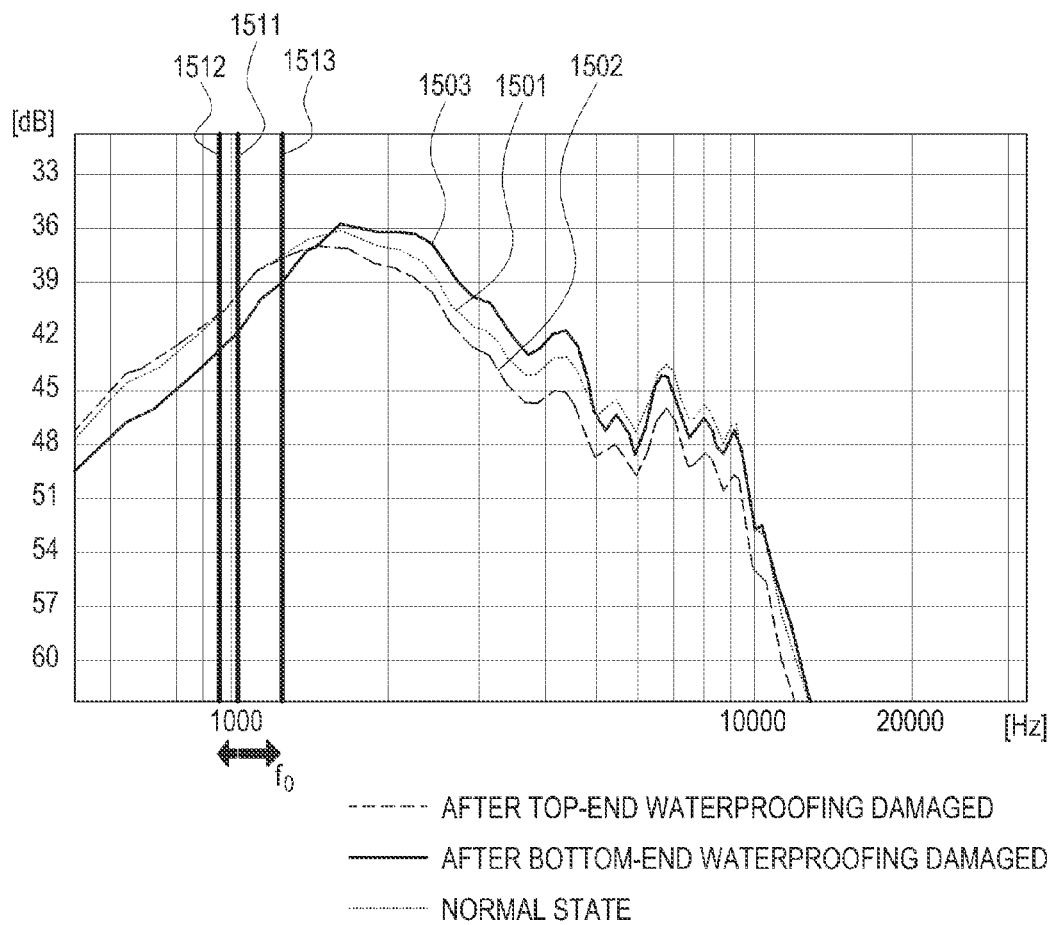
FIG. 15 is a graph illustrating a lowest resonant frequency specifically for a damage state according to various embodiments of the present disclosure.

FIG. 15 is a graph illustrating a lowest resonant frequency specifically for a damage state according to various embodiments of the present disclosure. In the graph of FIG. 15, the vertical axis denotes amplitude in decibels (dB), and the horizontal axis denotes frequency in hertz (Hz). The values of FIG. 15 are for illustration purposes, and embodiments are not limited thereto.

Referring to FIG. 15, signals 1501, 1502, and 1503 are measured for a case where the electronic device is in the normal state, for a case where top-end waterproofing of the electronic device is damaged, and for a case where bottom-end waterproofing of the electronic device is damaged, respectively, so as to determine lowest resonant frequencies 1511, 1512, and 1513 for the respective cases.

For example, it can be seen that the lowest resonant frequency 1512 for the case where the top-end waterproofing is damaged is lower than the lowest resonant frequency 1511 for the case where the electronic device is in the normal state.

It also can be seen that the lowest resonant frequency 1513 for the case where the bottom-end waterproofing is damaged is higher than the lowest resonant frequency 1511 for the case where the electronic device is in the normal state. As such, by checking the lowest resonant frequencies, it can be determined whether the top-end waterproofing or the bottom-end waterproofing is damaged.

FIG. 16 illustrates an internal structure of an electronic device according to various embodiments of the present disclosure.

Referring to FIG. 16, a waterproofing determining function according to an embodiment of the present disclosure may be provided by using the air vent hole 1610 emitting a sound based on vibration of a diaphragm in the speaker of the electronic device 1600 as a pipe-line with a sealing space for waterproofing or additionally forming a sound emitting hole for determining waterproofing.

Figure 17:
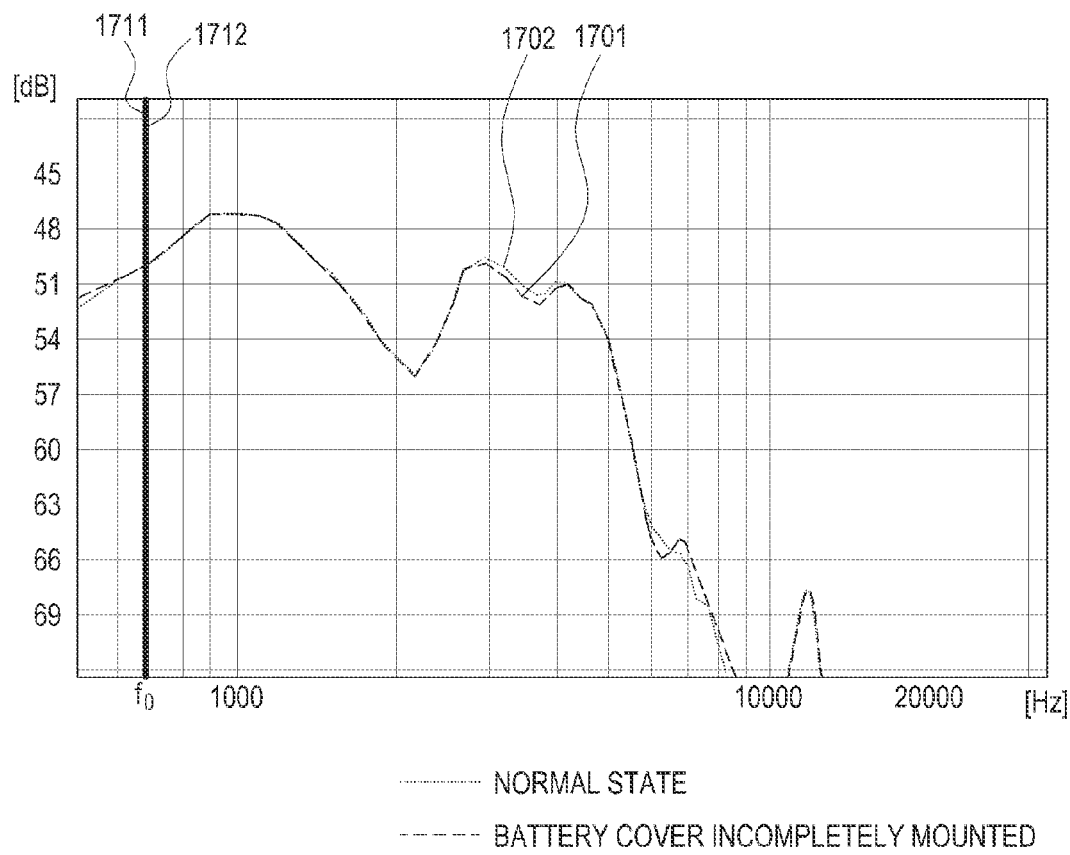
FIG. 17 is a graph illustrating a lowest resonant frequency specifically for a module structure according to various embodiments of the present disclosure.
Figure 18:
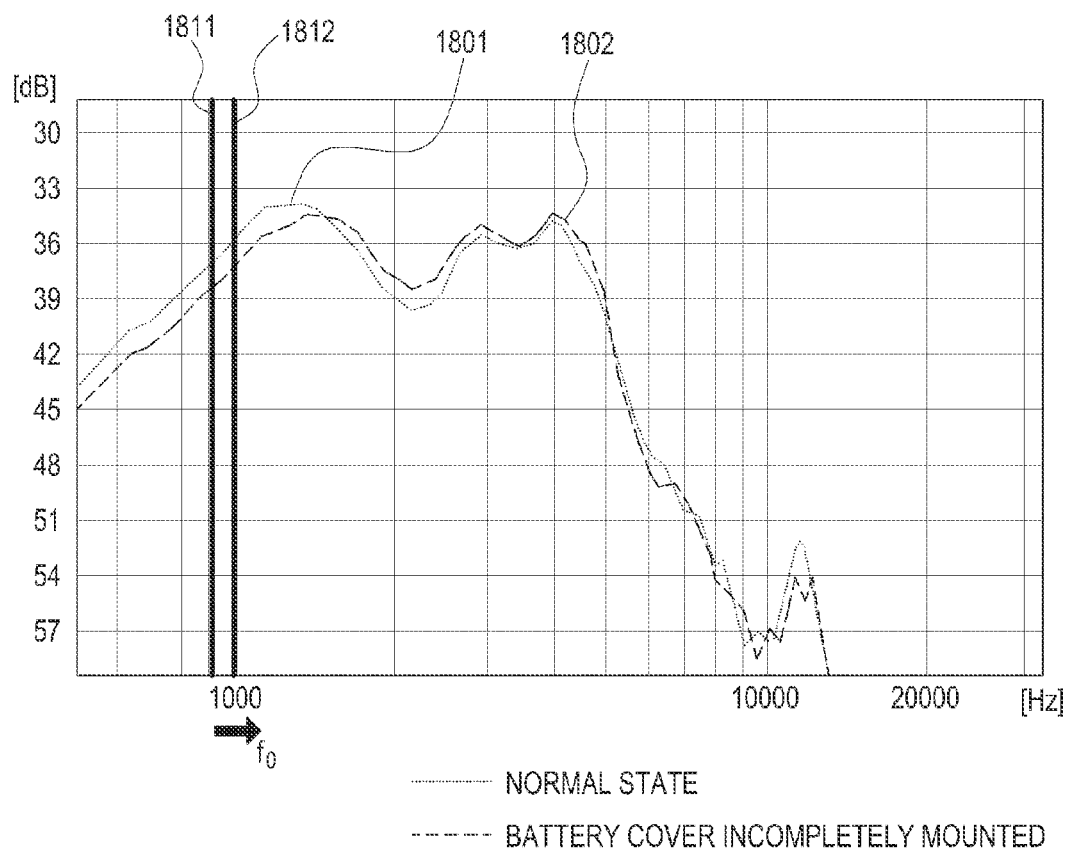
FIG. 18 is a graph illustrating a lowest resonant frequency specifically for a module structure according to various embodiments of the present disclosure.

FIG. 17 is a graph illustrating a change in a lowest resonant frequency in a complete module according to various embodiments of the present disclosure, and FIG. 18 is a graph illustrating a lowest resonant frequency after application of the sound emitting hole as shown in FIG. 16 according to various embodiments of the present disclosure. In the graphs of FIGS. 17 and 18, the vertical axis denotes amplitude in decibels (dB), and the horizontal axis denotes frequency in hertz (Hz). The values of FIGS. 17 and 18 are for illustration purposes, and embodiments are not limited thereto.

Referring to FIG. 17, in the complete module, a signal 1702 corresponding to the normal state of the electronic device and a signal 1701 corresponding to the incomplete mounting of the battery cover do not have a large difference therebetween, such that their corresponding lowest resonant frequencies 1712 and 1711 may also not have a large difference therebetween.

Referring to FIG. 18 for example, by applying the sound emitting hole as shown in FIG. 16, a signal 1801 corresponding to the normal state of the electronic device and a signal 1802 corresponding to the incomplete mounting of the battery cover have a larger difference therebetween, such that it is easier to determine from a difference between corresponding lowest resonant frequencies 1811 and 1812 whether the electronic device is abnormal (for example, whether the battery cover is incompletely mounted or whether the electronic device is waterproofed).

Figure 19:
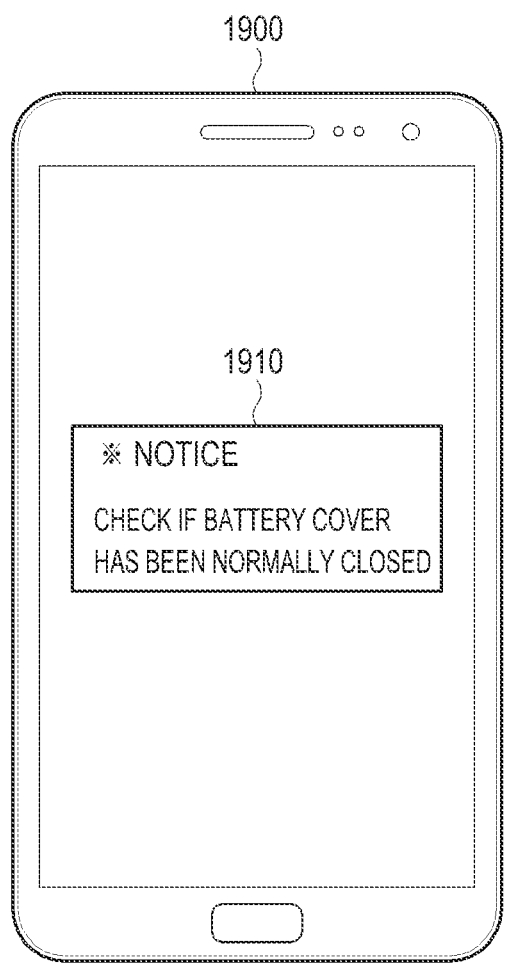
FIG. 19 illustrates screen display of an electronic device according to various embodiments of the present disclosure.

FIG. 19 illustrates screen display of an electronic device according to various embodiments of the present disclosure.

Referring to FIG. 19, if it is determined that an electronic device 1900 is in the abnormal state, an alert message 1910, "Check if Battery Cover Has Been Normally Closed", is displayed on the screen of the electronic device 1900 to alert the user. The alert type and configuration of FIG. 19 is for illustration purposes, and embodiments are not limited thereto.

According to various embodiments of the present disclosure, a time to determine whether the electronic device is abnormal may be set to a time when the user mounts or removes the battery cover. Moreover, according to various embodiments of the present disclosure, by adding a resistance for identifying an identification (ID) to the battery cover, a time when the battery cover is mounted on or removed from the main body of the electronic device may recognized.

Figure 20:
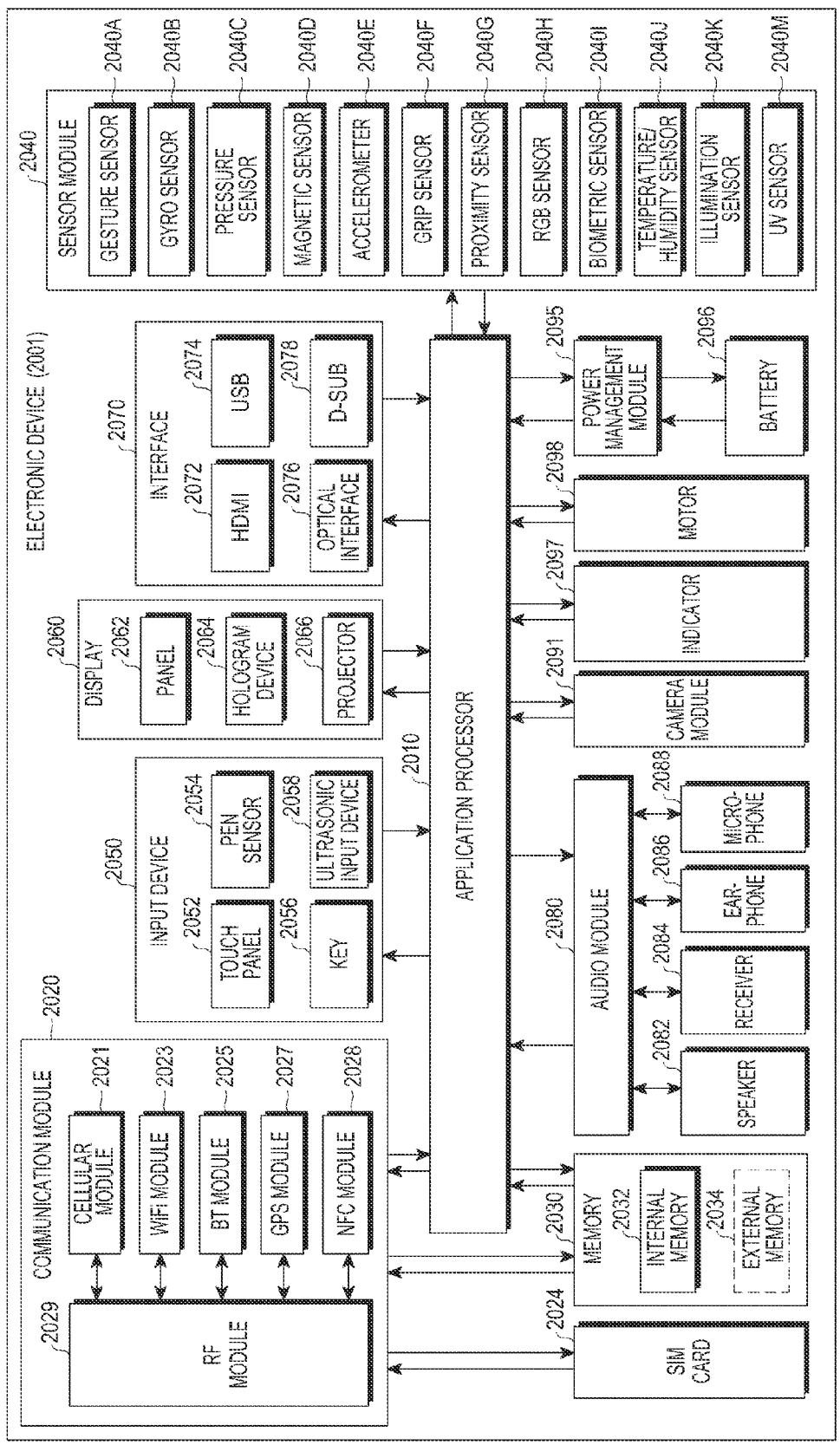
FIG. 20 is a block diagram of a detailed structure of an electronic device according to an embodiment of the present disclosure.

FIG. 20 is a block diagram of an electronic device according to various embodiments of the present disclosure.

Referring to FIG. 20, the electronic device 2001 may include the entire electronic device 101 illustrated in FIG. 1 or a part of the electronic device 101 illustrated in FIG. 1. The electronic device 2001 may include one or more APs 2010, a communication module 2020, a subscriber identification module (SIM) card 2024, a memory 2030, a sensor module 2040, an input module or device 2050, a display 2060, an interface 2070, an audio module 2080, a camera module 2091, a power management module 2095, a battery 2096, an indicator 2097, and/or a motor 2098.

The AP 2010 controls multiple hardware or software components connected to the AP 2010 by driving an OS or an application program, and performs processing and operations with respect to various data including multimedia data. The AP 2010 may be implemented with, for example, a system on chip (SoC). According to an embodiment of the present disclosure, the AP 2010 may further include a graphics processing unit (GPU) and/or an image signal processor. The AP 2010 may include at least some of the elements illustrated in FIG. 20 (e.g., a cellular module 2021). The AP 2010 loads a command or data received from at least one of the other elements (e.g., a non-volatile memory) into a volatile memory and processes the command or data, and stores various data in the non-volatile memory.

The communication module 2020 may have a configuration that is the same as or similar to the communication interface 170 illustrated in FIG. 1. The communication module 2020 may include, for example, the cellular module 2021, a WiFi module 2023, a Bluetooth (BT) module 2025, a GPS module 2027, a near field communication (NFC) module 2028, and a radio frequency (RF) module 2029.

The cellular module 2021 may provide, for example, a voice call, a video call, a text service, or an Internet service over a communication network. According to an embodiment, the cellular module 2021 may identify and authenticate the electronic device 2001 in a communication network by using a SIM (e.g., the SIM card 2024). According to an embodiment of the present disclosure, the cellular module 2021 also performs at least one of the functions that may be provided by the AP 2010. According to an embodiment of the present disclosure, the cellular module 2021 may include a CP.

At least one of the WiFi module 2023, the BT module 2025, the GPS module 2027, and the NFC module 2028 may include a processor for processing data transmitted and received by a corresponding module. According to an embodiment of the present disclosure, at least some (e.g., two or more) of the cellular module 2021, the WiFi module 2023, the BT module 2025, the GPS module 2027, and the NFC module 2028 may be included in one integrated chip (IC) or IC package.

The RF module 2029 may transmit and receive a communication signal (e.g., an RF signal). The RF module 2029 may include a transceiver, a power amplifier module (PAM), a frequency filter, a low noise amplifier (LNA), and/or an antenna. According to an embodiment of the present disclosure, at least one of the cellular module 2021, the WiFi module 2023, the BT module 2025, the GPS module 2027, and the NFC module 2028 may transmit and receive an RF signal through a separate RF module.

The SIM card 2024 may include a card including a SIM and/or an embedded SIM, and may include unique identification information (e.g., an integrated circuit card identifier (ICCID) or subscriber information (e.g., an international mobile subscriber identity (IMSI)).

The memory 2030 (e.g., the memory 130) may include an internal memory 2032 or an external memory 2034. The internal memory 2032 may include at least one of a volatile memory (e.g., dynamic random access memory (DRAM), static RAM (SRAM), synchronous DRAM (SDRAM), and a non-volatile memory (e.g., one time programmable read only memory (OTPROM), PROM, erasable PROM (EPROM), electrically EPROM (EEPROM), mask ROM, flash ROM, NAND flash memory, or NOR flash memory), and a solid state drive (SSD).

The external memory 2034 may further include flash drive, for example, compact flash (CF), secure digital (SD), micro-SD, mini-SD, extreme digital (xD), a multimedia card (MMC), or a memory stick. The external memory 2034 may be functionally and/or physically connected with the electronic device 2001 through various interfaces.

The sensor module 2040 measures physical quantity or senses an operation state of the electronic device 2001 to convert the measured or sensed information into an electric signal. The sensor module 2040 may include at least one of a gesture sensor 2040A, a gyro sensor 2040B, a pressure sensor 2040C, a magnetic sensor 2040D, an acceleration sensor 2040E, a grip sensor 2040F, a proximity sensor 2040G, a color sensor 2040H (e.g., red/green/blue (RGB) sensor), a biometric sensor 2040I, a temperature/humidity sensor 2040J, an illumination sensor 2040K, and an ultraviolet (UV) sensor 2040M. Additionally or alternatively, the sensor module 2040 may include an e-nose sensor (not shown), an electromyography (EMG) sensor (not shown), an electroencephalogram (EEG) sensor (not shown), an electrocardiogram (ECG) sensor (not shown), or a fingerprint sensor. The sensor module 2040 may further include a control circuit for controlling at least one sensor included therein. In an embodiment of the present disclosure, the electronic device 2001 may further include a processor configured to control the sensor module 2040 as part of or separately from the AP 2010, to control the sensor module 2040 during a sleep state of the AP 2010.

The input module or device 2050 may include a touch panel 2052, a (digital) pen sensor 2054, a key 2056, and/or an ultrasonic input device 2058. The touch panel 2052 may use at least one of a capacitive type, a resistive type, an IR type, or an ultrasonic type. The touch panel 2052 may further include a control circuit. The touch panel 2052 may further include a tactile layer to provide tactile reaction to the user.

The (digital) pen sensor 2054 may include a recognition sheet which is a part of the touch panel 2052 or a separate recognition sheet. The key 2056 may also include a physical button, an optical key, or a keypad. The ultrasonic input device 2058 senses ultrasonic waves generated in an input means for generating the ultrasonic waves through a microphone (e.g., a microphone 2088) and checks data corresponding to the sensed ultrasonic waves.

The display 2060 (e.g., the display 160) may include a panel 2062, a hologram 2064, and/or a projector 2066. The panel 2062 may have a configuration that is the same as or similar to that of the display 160 of FIG. 1. The panel 2062 may be implemented to be flexible, transparent, or wearable. The panel 2062 may be configured with the touch panel 2052 in one module. The hologram 2064 shows a stereoscopic image in the air by using interference of light. The projector 2066 displays an image onto an external screen through projection of light. The screen may be positioned inside or outside of the electronic device 2001. According to an embodiment of the present disclosure, the display 2060 may further include a control circuit for controlling the panel 2062, the hologram 2064, or the projector 2066.

The interface 2070 may include an HDMI 2072, a USB 2074, an optical communication interface 2076, or a D-subminiature 2078. The interface 2070 may be included in the communication interface 170 illustrated in FIG. 1. Additionally or alternatively, the interface 2070 may include a mobile high-definition link (MHL) interface, an SD/MMC interface, or an infrared data association (IrDA) interface.

The audio module 2080 bi-directionally converts sound and an electric signal. At least one element of the audio module 2080 may be included in the I/O interface 150 illustrated in FIG. 1. The audio module 2080 processes sound information input or output through a speaker 2082, a receiver 2084, an earphone 2086, and/or the microphone 2088.

For example, according to various embodiments of the present disclosure, the AP 2010 may sense a feedback signal corresponding to a reference signal output to the speaker 2082 (for example, the speaker 182 of FIG. 1) to calculate a lowest resonant frequency and/or an excursion value, and determine waterproofing of the electronic device 2001 (for example, the electronic device 101 of FIG. 1) from the calculated lowest resonant frequency and/or excursion value.

According to various embodiments of the present disclosure, the audio module 2080 (for example, the audio module 181 of FIG. 1) senses a feedback signal with respect to the reference signal output to the speaker 2082, and the AP 2010 calculates a lowest resonant frequency and/or an excursion value from a signal (e.g., a voltage and/or a current of the sensed signal) sensed by the audio module 2080 to determine waterproofing of the electronic device 2001 from the calculated lowest resonant frequency and/or excursion value.

The camera module 2091 is a device capable of capturing a still image or a moving image, and according to an embodiment of the present disclosure, may include one or more image sensors (e.g., a front sensor and/or a rear sensor), a lens, an image signal processor (ISP), and/or a flash (e.g., an LED or a xenon lamp).

The power management module 2095 manages power of the electronic device 2001. According to an embodiment of the present disclosure, the power management module 2095 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 2096 or the voltage, current, or temperature of the battery 2096 during charging. The battery 2096 may include a rechargeable battery and/or a solar battery.

The indicator 2097 displays a particular state, for example, a booting state, a message state, or a charging state, of the electronic device 2001 or a part thereof (e.g., the AP 2010). The motor 2098 converts an electric signal into mechanical vibration or generates vibration or a haptic effect. Although not shown, the electronic device 2001 may include a processing device (e.g., a GPU) for supporting a mobile TV. The processing device for supporting the mobile TV processes media data according to a standard such as digital multimedia broadcasting (DMB), digital video broadcasting (DVB), or mediaFlo™.

Each of the foregoing elements described herein may include one or more components, and a name of the part may vary with a type of the electronic device 2001. The electronic device according to the present disclosure may include at least one of the foregoing elements, and some of the elements may be omitted therefrom or other elements may be further included therein. As some of the elements of the electronic device according to the present disclosure are coupled into one entity, the same function as those of the elements that have not been coupled may be performed.

Figure 21:
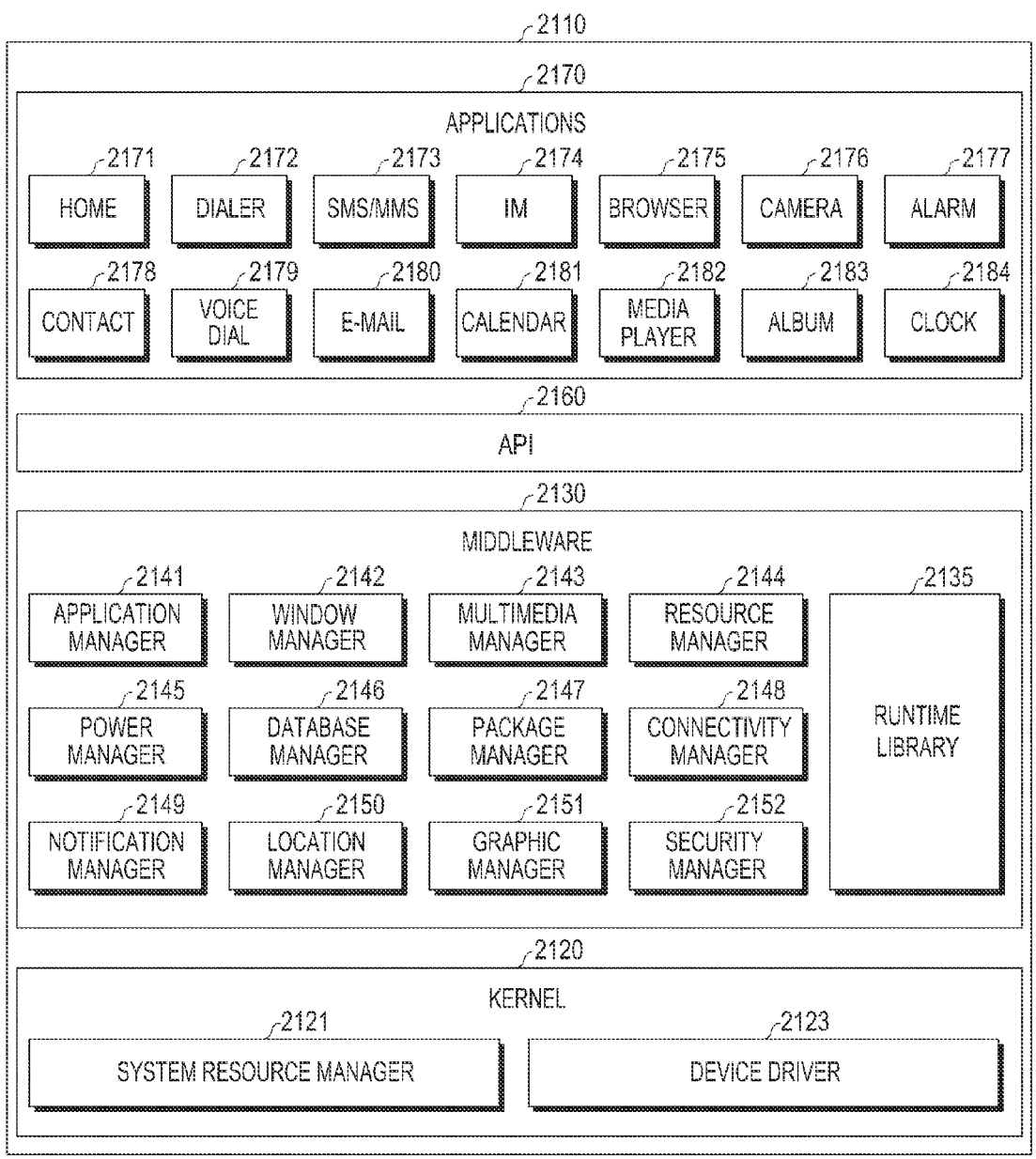
FIG. 21 is a block diagram of a program module according to various embodiments of the present disclosure.

FIG. 21 is a block diagram of a programming module according to various embodiments of the present disclosure. According to an embodiment of the present disclosure, the programming module 2110 (e.g., the program 140 of FIG. 1) may include an OS for controlling resources associated with an electronic device (e.g., the electronic device 101 of FIG. 1) and/or various applications executed on the OS. The OS may include Android, iOS, Windows, Symbian, Tizen, or Bada.

Referring to FIG. 21, the programming module 2110 may include a kernel 2120, a middleware 2130, an API 2160, and/or an application 2170. At least a part of the programming module 2110 may be preloaded on an electronic device or may be downloaded from a server (e.g., the server 106 of FIG. 1).

The kernel 2120 (e.g., the kernel 141 of FIG. 1) may include a system resource manager and/or a device driver 2123. The system resource manager 2121 may perform control, allocation, or retrieval of system resources. According to an embodiment of the present disclosure, the system resource manager 2121 may include a process management unit, a memory management unit, or a file system. The device driver 2123 may include, for example, a display driver, a camera driver, a BT driver, a shared memory driver, a USB driver, a keypad driver, a WiFi driver, an audio driver, and/or an inter-process communication (IPC) driver.

The middleware 2130 may provide functions that the application 2170 commonly requires or provide various functions to the application 2170 through the API 2160 to allow the application 2170 to efficiently use a limited system resource in an electronic device. According to an embodiment of the present disclosure, the middleware 2130 (e.g., the middleware 143 of FIG. 1) may include at least one of a runtime library 2135, an application manager 2141, a window manager 2142, a multimedia manager 2143, a resource manager 2144, a power manager 2145, a database manager 2146, a package manager 2147, a connectivity manager 2148, a notification manager 2149, a location manager 2150, a graphic manager 2151, and/or a security manager 2152.

The runtime library 2135 may include a library module that a compiler uses to add a new function through a programming language while the application 2170 is executed. The runtime library 2135 performs functions relating to an I/O, memory management, or calculation operation.

The application manager 2141 manages a life cycle of at least one application among the applications 2170. The window manager 2142 manages a GUI resource using a screen. The multimedia manager 2143 recognizes a format necessary for playing various media files and performs encoding or decoding on a media file by using a codec appropriate for a corresponding format. The resource manager 2144 manages a resource such as source code, memory, or storage space of at least one application among the applications 2170.

The power manager 2145 manages a battery or power in operation with a basic input/output system (BIOS) and provides power information necessary for an operation of the electronic device. The database manager 2146 performs a management operation to generate, search or change a database used for at least one application among the applications 2170. The package manager 2147 manages the installation or update of an application distributed in a package file format.

The connectivity manager 2148 manages a wireless connection such as a WiFi or BT connection. The notification manager 2149 displays or notifies events such as arrival messages, appointments, and proximity alerts in a manner that is not disruptive to a user. The location manager 2150 manages location information of an electronic device. The graphic manager 2151 manages a graphic effect to be provided to a user or a user interface (UI) related thereto. The security manager 2152 provides a general security function necessary for system security or user authentication. According to an embodiment of the present disclosure, when an electronic device (e.g., the electronic device 101) has a call function, the middleware 2130 may further include a telephony manager for managing a voice or video call function of the electronic device.

The middleware 2130 may include a middleware module forming a combination of various functions of the above-mentioned internal elements. The middleware 2130 may provide modules specified according to types of OS so as to provide distinctive functions. Additionally, the middleware 2130 may delete some of existing elements or add new elements dynamically.

The API 2160 (e.g., the API 145 of FIG. 1) may be provided as a set of API programming functions with a different configuration according to the OS. In the case of Android or iOS, for example, one API set may be provided by each platform, and in the case of Tizen, two or more API sets may be provided.

The application 2170 (e.g., the application program 147 of FIG. 1) may include one or more applications capable of providing a function, for example, a home application 2171, a dialer application 2172, a short messaging service (SMS)/multimedia messaging service (MMS) application 2173, an instant message (IM) application 2174, a browser application 2175, a camera application 2176, an alarm application 2177, a contact application 2178, a voice dial application 2179, an e-mail application 2180, a calendar application 2181, a media player application 2182, an album application 2183, a clock application 2184, a health care application (e.g., an application for measuring an exercise amount or a blood sugar), or an environment information providing application (e.g., an application for providing air pressure, humidity, or temperature information).

According to an embodiment of the present disclosure, the application 2170 may include an application (hereinafter, an "information exchange application" for convenience) supporting information exchange between the electronic device (e.g., the electronic device 101 of FIG. 1) and an external electronic device (e.g., the electronic devices 102 or 104 of FIG. 1). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 104 of FIG. 1). The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display, a service provided by an application operating in an external electronic device or provided by the external electronic device (e.g., a call service or a message service).

According to an embodiment of the present disclosure, the application 2170 may include an application (e.g., a health care application) designated according to an attribute of the external electronic device (e.g., a type of the electronic device being mobile medical equipment as the attribute of the electronic device). According to an embodiment of the present disclosure, the application 2170 may include an application received from the external electronic device (e.g., the server 106 or the electronic device 102 or 104 of FIG. 1). According to an embodiment of the present disclosure, the application 2170 may include a preloaded application or a third party application that may be downloaded from the server. Names of elements of the programming module 2110 according to the illustrated embodiment of the present disclosure may vary depending on a type of an OS.

According to various embodiments of the present disclosure, at least a part of the programming module 2110 may be implemented by software, firmware, hardware, or a combination thereof. The at least part of the programming module 2110 may be implemented (e.g., executed) by a processor (e.g., the AP 2010 of FIG. 20). The at least part of the programming module 2110 may include a module, a program, a routine, sets or instructions, or a process for performing one or more functions.

A term "module" or "functional unit" used herein may mean, for example, a unit including one of or a combination of two or more of hardware, software, and firmware. The "module" may be interchangeably used with a unit, logic, a logical block, a component, or a circuit. The "module" or "functional unit" may be a minimum unit or a portion of an integrated component. The "module" or "functional unit" may be a minimum unit or a portion thereof performing one or more functions. The "module" or "functional unit" may be implemented mechanically or electronically. For example, the "module" or "functional unit" according to the embodiments of the present disclosure may include at least one of an application-specific integrated circuit (ASIC) chip, field-programmable gate arrays (FPGAs), and a programmable-logic device performing certain operations already known or to be developed.

At least a part of a device (for example, modules or functions thereof) or a method (for example, operations) according to various embodiments of the present disclosure may be implemented with a command stored in a non-transitory computer-readable storage medium in the form of a program module. When the command is executed by a processor (for example, the processor 120 of FIG. 1), the one or more processors may perform a function corresponding to the command. The computer-readable storage medium may be, for example, the memory 130 of FIG. 1.

The computer readable recording medium includes magnetic media such as hard disk, floppy disk, or magnetic tape, optical media such as compact disc ROM (CD-ROM) or DVD, magneto-optical media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

According to various embodiments of the present disclosure, a storage medium having stored thereon commands that, when executed by at least one processors, are set to cause the processor to perform at least one operation including outputting a reference signal in the form of a sound through a speaker, sensing a signal by feeding back the reference signal transmitted to the speaker, calculating a lowest resonant frequency from the sensed signal, and determining whether the electronic device is waterproofed based on the calculated lowest resonant frequency.

As is apparent from the foregoing description, with the electronic device and the method for determining waterproofing of the electronic device according to various embodiments of the present disclosure, a user may easily determine waterproofing of the electronic device anytime and anywhere.

Moreover, by determining waterproofing of the electronic device with a feedback line provided in the electronic device, the waterproofing of the electronic device may be determined without a separate additional cost.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a speaker disposed inside the housing; and
a processor disposed inside the housing and configured to:
control the speaker to output a reference signal in the form of a sound,
receive a feedback signal corresponding to the reference signal outputted in a resonance space inside the housing,
determine a lowest resonant frequency from the feedback signal, and
determine whether the electronic device is waterproofed based on whether a value of the lowest resonant frequency is within a preset range.

2. The electronic device of claim 1, further comprising a voice signal processor to perform voice signal processing on the reference signal, the voice signal processor being configured to:
sense at least one of a voltage or a current of the feedback signal, and
provide information related to the sensed voltage and current to the processor.

3. The electronic device of claim 1, further comprising an amplification unit to amplify the reference signal, the amplification unit being configured to:
sense at least one of a voltage or a current of the feedback signal, and
provide information related to the sensed voltage and current to the processor.

4. The electronic device of claim 1, wherein the processor is further configured to determine that the electronic device is not in a normal state if the lowest resonant frequency is outside of the preset range.

5. The electronic device of claim 1, wherein the processor is further configured to determine that a battery cover is not completely closed if the lowest resonant frequency is outside of the preset range.

6. The electronic device of claim 5, further comprising a display,
wherein, if the processor determines that the battery cover is not completely closed, an alert message is displayed through the display.

7. The electronic device of claim 1, wherein the processor is further configured to:
determine an excursion value from the feedback signal, and
determine whether the electronic device is waterproofed based on the excursion value.

8. The electronic device of claim 7, wherein the processor is further configured to determine that the electronic device is not in a normal state if the excursion value is outside of the preset range.

9. The electronic device of claim 1, wherein, if the speaker is configured as a module integrated in the electronic device, the module comprises a hole that communicates a sound from an inner side thereof to an outer side thereof.

10. The electronic device of claim 1, wherein the processor is further configured to:
determine whether a battery cover of the electronic device is opened or closed, and
determine whether the electronic device is waterproofed when the battery cover is closed.

11. A method for operating an electronic device, the method comprising:

outputting a reference signal in the form of a sound through a speaker disposed inside a housing of the electronic device;

receiving a feedback signal corresponding to the reference signal outputted in a resonance space inside the housing;

determining a lowest resonant frequency from the feedback signal; and determining whether the electronic device is waterproofed based on whether a value of the lowest resonant frequency is within a preset range.

12. The method of claim 11, further comprising:

performing, by a voice signal processor, voice signal processing on the reference signal; and sensing, by the voice signal processor, at least one of a voltage or a current of the feedback signal.

13. The method of claim 12, further comprising:

amplifying the reference signal that has been signal-processed by the voice signal processor; and sensing, by an amplification unit, at least one of a voltage or a current from the feedback signal.

14. The method of claim 11, further comprising determining that the electronic device is not in a normal state if the lowest resonant frequency is outside of the preset range.

15. The method of claim 11, further comprising determining that a battery cover is not completely closed if the lowest resonant frequency is outside of the preset range.

16. The method of claim 15, further comprising displaying an alert message through a display if it is determined that the battery cover is not completely closed.

17. The method of claim 11, further comprising:

determining an excursion value from the feedback signal; and determining whether the electronic device is waterproofed based on the excursion value.

18. The method of claim 17, further comprising determining that the electronic device is not in a normal state if the excursion value is outside of the preset range.

19. The method of claim 11, further comprising:

determining whether a battery cover of the electronic device is opened or closed; and determining whether the electronic device is waterproofed when the battery cover is closed.

20. A non-transitory computer-readable recording medium having recorded thereon a program to be executed on a computer, wherein the program comprises an executable command, when executed by a processor, for causing the processor to perform:

outputting a reference signal in the form of a sound through a speaker disposed inside a housing of the electronic device;

receiving a feedback signal corresponding to the reference signal outputted in a resonance space inside the housing;

determining a lowest resonant frequency from the feedback signal; and determining whether the electronic device is waterproofed based on whether a value of the lowest resonant frequency is within a preset range.

* * * * *